United States Patent
Aghasi et al.

(10) Patent No.: US 12,474,462 B2
(45) Date of Patent: Nov. 18, 2025

(54) INTEGRATED WIDEBAND STEPPED-CHIRP RADAR SENSOR

(71) Applicant: THE REGENTS OF THE UNIVERSITY OF CALIFORNIA, Oakland, CA (US)

(72) Inventors: Hamidreza Aghasi, Irvine, CA (US); Payam Heydari, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 514 days.

(21) Appl. No.: 17/856,005

(22) Filed: Jul. 1, 2022

(65) Prior Publication Data

US 2022/0404483 A1     Dec. 22, 2022

Related U.S. Application Data

(63) Continuation of application No. PCT/US2021/012086, filed on Jan. 4, 2021.

(60) Provisional application No. 62/958,231, filed on Jan. 7, 2020.

(51) Int. Cl.
    *G01S 13/58*      (2006.01)

(52) U.S. Cl.
    CPC .................... *G01S 13/584* (2013.01)

(58) Field of Classification Search
None
See application file for complete search history.

(56) References Cited

U.S. PATENT DOCUMENTS

| | | | | |
|---|---|---|---|---|
| 9,383,442 | B2* | 7/2016 | Hampikian | G01S 13/584 |
| 9,960,883 | B1* | 5/2018 | Chakraborty | H03D 7/1458 |
| 10,200,049 | B2* | 2/2019 | Bisanti | H03L 7/185 |
| 2014/0232598 | A1 | 8/2014 | Dai et al. | |
| 2015/0092683 | A1* | 4/2015 | Rangarajan | H04B 1/406 370/329 |
| 2016/0380754 | A1 | 12/2016 | Chen et al. | |
| 2018/0019755 | A1 | 1/2018 | Josefsberg et al. | |
| 2018/0062888 | A1 | 3/2018 | Johnson | |
| 2019/0260617 | A1* | 8/2019 | Ott | H03C 3/095 |
| 2019/0372576 | A1 | 12/2019 | Jung et al. | |

FOREIGN PATENT DOCUMENTS

WO    PCT/US21/12086      7/2021

* cited by examiner

*Primary Examiner* — Vladimir Magloire
(74) *Attorney, Agent, or Firm* — ONE LLP

(57) ABSTRACT

The disclosed FMCW radar system is configured to achieve a wide synthetic bandwidth of operation and a high range resolution. The disclosed FMCW radar system includes a receiver that combines the intermediate frequency (IF) components of multiple narrowband receivers to achieve the millimeter-scale range resolution. The disclosed FMCW radar system can be easily scaled, which enables it to be deployed in large arrays of antennas in order to attain high angular resolution. Additionally, the operation frequency of the disclosed FMCW radar system enables millimeter level cross-range resolution. In this manner, accurate estimation of the location and/or velocity of the objects within the local-sensing range (and potentially beyond) can be achieved.

19 Claims, 22 Drawing Sheets

| Frequency Range (GHz) | 1-30 | 30-90 | $90 - \frac{f_{max}}{2}$ | Above $\frac{f_{max}}{2}$ |
|---|---|---|---|---|
| Size of Antennas* | Tens of cm | mm | mm | Sub mm |
| Power Efficiency | High | Ok | Ok | Very Low |
| Achievable BW/range resolution | Few Ghz/tens of cm | <15 GHz / cm scale | >15 GHz / mm scale | >15 GHz/mm-scale |
| 3-dB beamwidth (lateral resolution) | 12.17* at 2.4 Ghz | 1* at 30 GHz | 0.32* at 90GHz | 0.15* at 200 GHz |
| Angular Resolution for antenna diameter 20cm** | 44* at 2.4 Ghz | 3.5* at 30 GHz | 1.15* at 90 GHz | 0.5* at 200 GHz |
| Range for 2W EIRP and 51dBm RX sensitivity **** | Kilometers | | | |
| Has Licensed Bands | Yes | Yes | No | No |

| Local-Area Sensing Zone Requirements |
|---|
| Millimeter antenna size |
| High efficiency |
| Millimeter-scale range resolution |
| < 1° 3-dB beamwidth * |
| < 2° angular resolution ** |
| Tens of meters range |
| No licensed bands |

\* To obtain a submeter cross-range resolution at 50 meter range
\*\* To distinguish people in densely populated areas at 50 meter range
\*\*\* The size comparisons are based on patch antennas which have broadside radiation.
\*\*\*\* The antenna dimensions are limited by the maximum size of sensing nodes.
\*\*\*\*\* Sensitivity = −174 dBm + 10log (BW=2GHz) + NF (15 dB) + SNR (15 dB)

FIG. 1

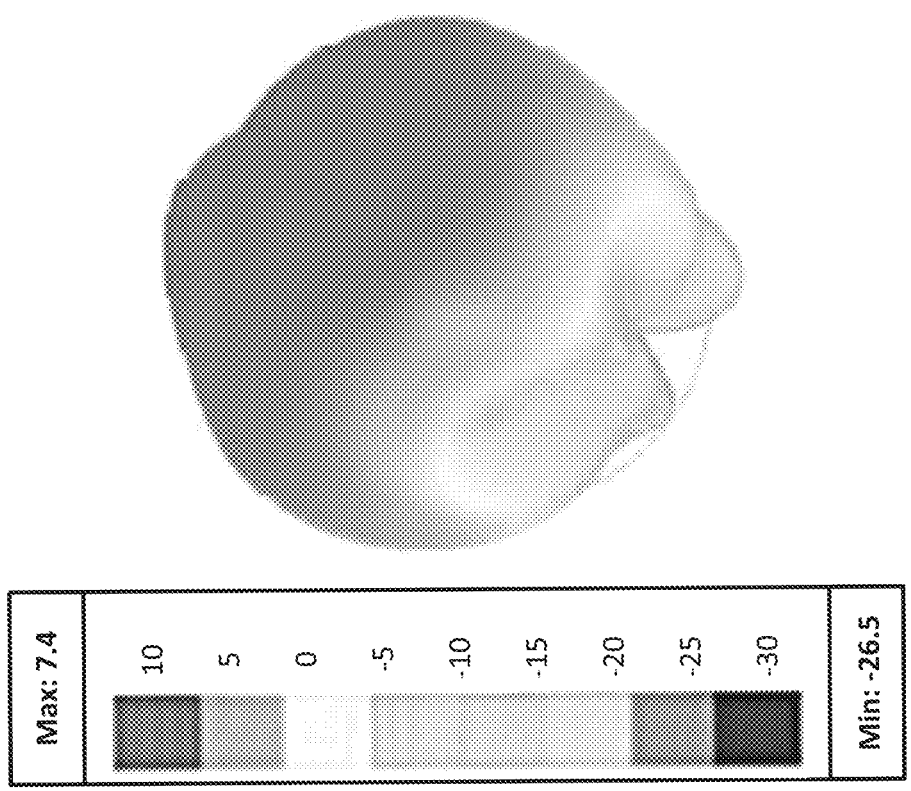
*FIG. 11B*
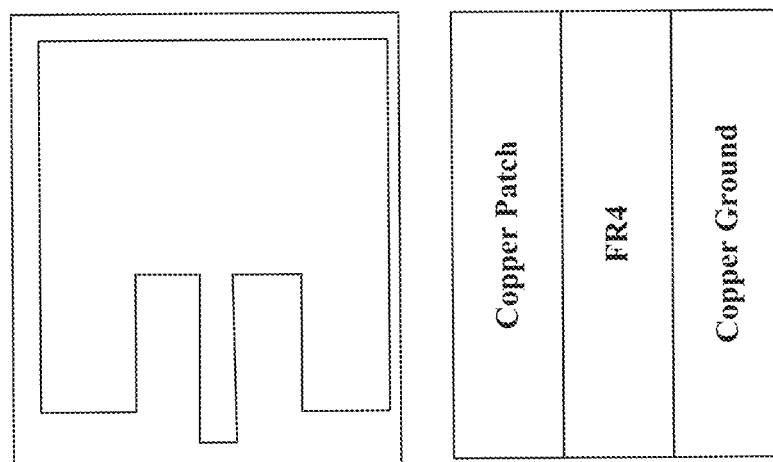
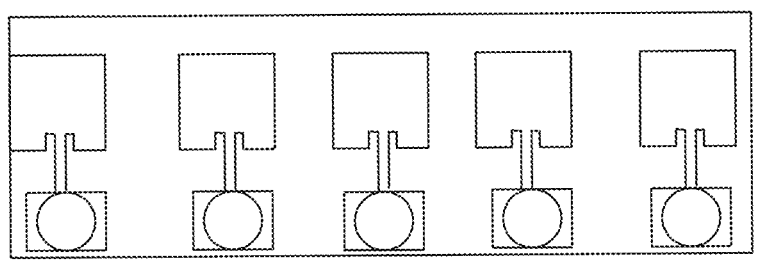
*FIG. 11A*

INTEGRATED WIDEBAND STEPPED-CHIRP RADAR SENSOR

CROSS-REFERENCE TO RELATED APPLICATIONS

The present application is a continuation of International Patent Application No. PCT/US21/12086, filed Jan. 4, 2021, which claims priority to U.S. Provisional Application No. 62/958,231, filed Jan. 7, 2020, the contents of both of which are incorporated herein by reference in their entireties.

BACKGROUND

Deployment of a local-area smart infrastructure mandates a network with constituent sensors being able to cover up to a range of 50 meters, achieve sub-centimeter-level range resolution, and capture mobile objects at an angular resolution less than 2°. Because of these stringent operating requirements, conventional frequency modulated continuous wave (FMCW) based active sensors is incapable of achieving such requirements. Accordingly, what is needed is an improved radar system that can resolve fundamental problems associated with the conventional active sensors and meet the stringent operating requirements.

SUMMARY

Disclosed herein are methods and systems for stepped chirp radar system that can provide a wideband operating (synthetic) bandwidth while having sub-centimeter-level range resolution and capturing mobile objects at an angular resolution less than 2° at a 50-meter range. One of the systems includes: a first and second dual-voltage control oscillator (d-VCO); a reference PLL coupled to the first d-VCO, the reference PLL configured to control an oscillation frequency range of the first d-VCO with a first output control voltage; and a first mixing phase-lock loop (PLL) configured to receive outputs from the first and the second d-VCOs and to output a second output control voltage to control an oscillation frequency range of the first and second d-VCOs.

The system can also include: a frequency reference generator configured to output a reference frequency; and an injection-locked amplifier (ILA) configured to receive an output of the frequency reference generator and to provide an output signal to the reference PLL.

The ILA is configured to sweep an oscillation frequency of the first d-VCO, and the first mixing PLL is configured to control the oscillation frequency of the second d-VCO such that there is a frequency difference from the oscillation frequency of the first d-VCO.

The radar system can further include: a third d-VCO; and a second mixing phase-lock loop (PLL) configured to receive outputs from the second and the third d-VCOs and to output a third output control voltage to control an oscillation frequency range of the third d-VCO such that there is a frequency range difference from the oscillation frequency range of the second d-VCO.

The first and second mixing PLLs can be locked to the same frequency. The oscillation frequency range of each d-VCO can be different. In the second mixing PLL, the third output control voltage can be provided to an input of the second d-VCO.

The radar system can include a plurality of narrowband receivers, where each narrowband receiver is configured to a different range of sub-band. The first narrowband receiver can include: an antenna; a low noise amplifier coupled to the antenna; and a mixer coupled to the low noise amplifier, the first d-VCO, and a bandpass filter.

Also disclosed a stepped chirp transmitter that includes: a reference PLL; a reference frequency generator configured to sweep an input frequency of the reference PLL; and a plurality of stepped chirp circuit assemblies coupled in series, where a first stepped chirp circuit assembly is coupled to an output control voltage of the reference PLL, and where each stepped chirp circuit assembly is configured to output a different range of output frequencies.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

FIG. 1 is a chart illustrating sensor design requirements for local-area sensing at various frequency bands.

FIG. 11A is a cross-sectional view of an E-shape patch antenna in accordance with some embodiments of the present disclosure.

FIG. 11B is a diagram illustrating the gain radiation pattern of the sub-band antenna shown in FIG. 11A.

Figure 2A:
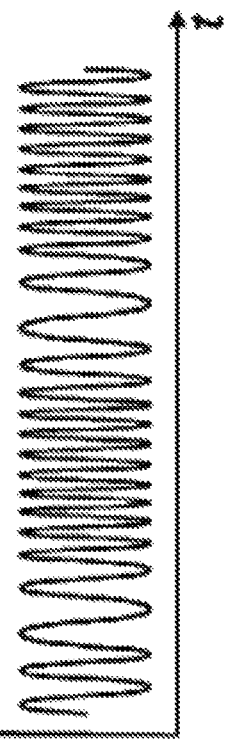
FIGS. 2A-H are charts illustrating various principles of the operation of FMCW sensing nodes based on the periodic transmission of frequency chirps.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

Overview

FIG. 1 is a chart 100 illustrating sensor design requirements for local-area sensing at various frequency bands. Chart 100 demonstrates a summary of performance requirements expected from sensors deployed in a local-area sensing zone. As shown in chart 100, a system with an angular spacing discrimination as small as 2°—which is essential for security systems and for systems that require a resolution that can resolve an individual person at a local-area sensing zone—calls for large radiating elements (antenna arrays) if operation frequency is below 90 GHz. For millimeter-scale range resolution and sub-one-degree 3-dB beamwidth, which are essentially necessary for a connected local-area sensing zone, sensing nodes that can operate at bandwidths greater than 15 GHz and frequencies above 90 GHz are required. It is noteworthy that cross-range resolution in these applications is primarily dependent on the electrical attributes of the sensors, as optical engineering of the beamwidth (e.g., beam focusing) severely limits the portability of the sensors, and therefore, is not feasible. At frequencies above $f_{max}/2$ (where $f_{max}<400$ GHz denotes the maximum operation frequency of a nanoscale transistor), the power generation efficiency and noise figure of the transistor are severely degraded. Moreover, the path loss of electromagnetic waves increases quadratically with frequency, thereby limiting the range. All these limitations explicitly result in stringent requirements on the transmitted power and the receiver sensitivity.

As an example, a sub-meter cross range resolution at 50 m range at 90 GHz is achievable with maximum effective isotropic radiated power (EIRP) of 2 W, which is recommended to overcome the path loss for an acceptable receiver sensitivity of −51 dBm. This example system can be generated by conventional silicon technologies. However, to achieve the same range at frequencies above $f_{max}/2$, at least 4.5 times higher power is required to obtain similar system performance parameters. This kind of parameters requirement is challenging due to low-efficiency power generation at these frequencies. Therefore, as shown in chart 100, the frequency range falling between 90 GHz and $f_{max}/2$ (90 GHz–$f_{max}/2$) is a viable choice for attaining high resolution performance for the desired range of coverage in local-area sensing zones.

Figure 2B:
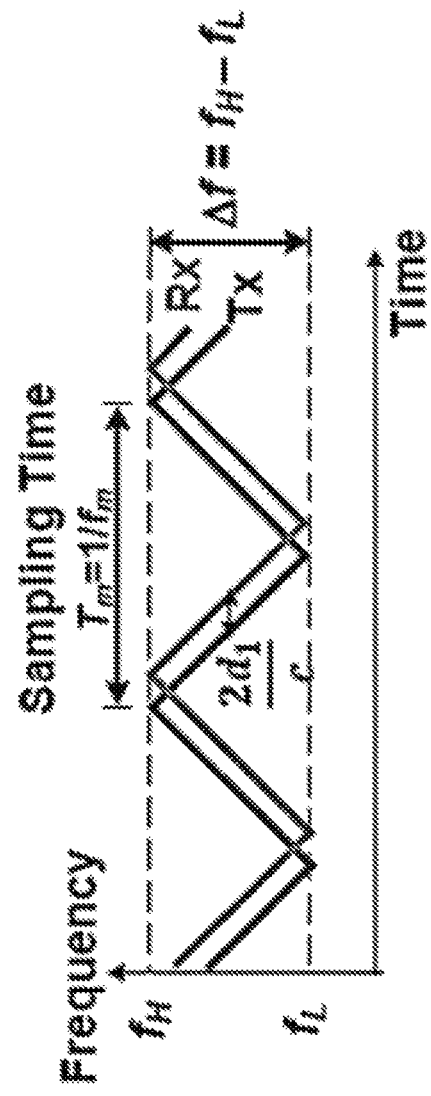
Figure 2C:
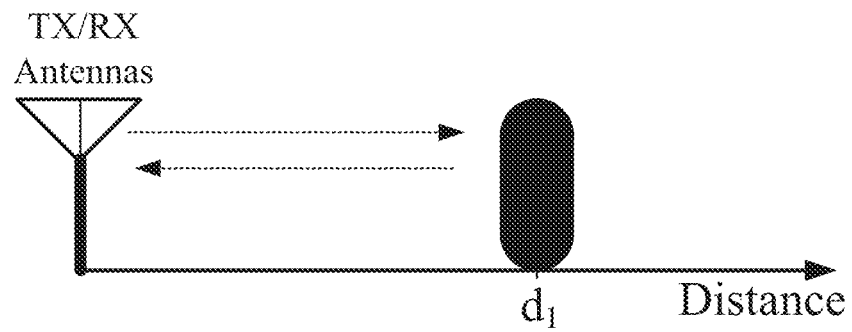

There are two widely used architectures, a pulse-radar and a frequency-modulated continuous-wave (FMCW) radar. The latter can attain doppler information, which allows motion and/or velocity to be estimated. The operation principle of an FMCW radar sensor is shown in FIGS. 2A-B. A FMCW sensor can generate a frequency modulated signal $S_{TX}$ (FIG. 2A) with a linear frequency-time profile (FIG. 2B). The transmitted chirps are continuously swept in frequency from $f_L$ to $f_H$. Conventionally, to avoid sharp spectral transitions, both rising and falling chirps are adopted to form a triangular sweep with a time period of $T_m$. Assuming a target at a distance of $d_1$ from the FMCW transmitter, it would take d 1/c seconds (c being the speed of light) for the radiated signal to illuminate the object and an additional d 1/c seconds for the receiver to detect the reflected wave (see FIG. 2C).

Figure 2D:
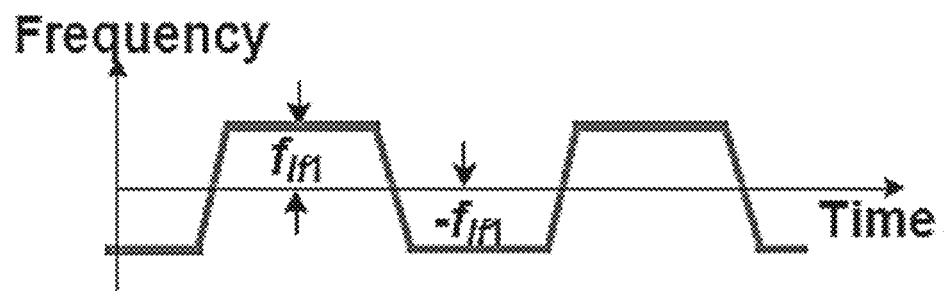

At the end of the $2d_1/c$ travel time, the instantaneous frequency of the transmitted chirp changes by $2Sd_1/c$ [where $S=2(f_H-f_L)/T_m$]. In this manner, the FMCW sensor can determine the target distance so long as the total travel time is smaller than a half-period of the triangular chirp (i.e., the unambiguous range is upper-limited by $d_{max}=cT_m/4$). In light of the constant speed of propagation, to increase the range in FMCW radar sensors, the sweeping time of the transmitted chirp can be increased. To estimate the range of target, the difference between the transmitted and received frequencies, commonly known to be intermediate frequency (IF), $f_{IF1}=2Sd_1/c$, is directly used at any instance of time (see FIG. 2D).

Figure 2E:
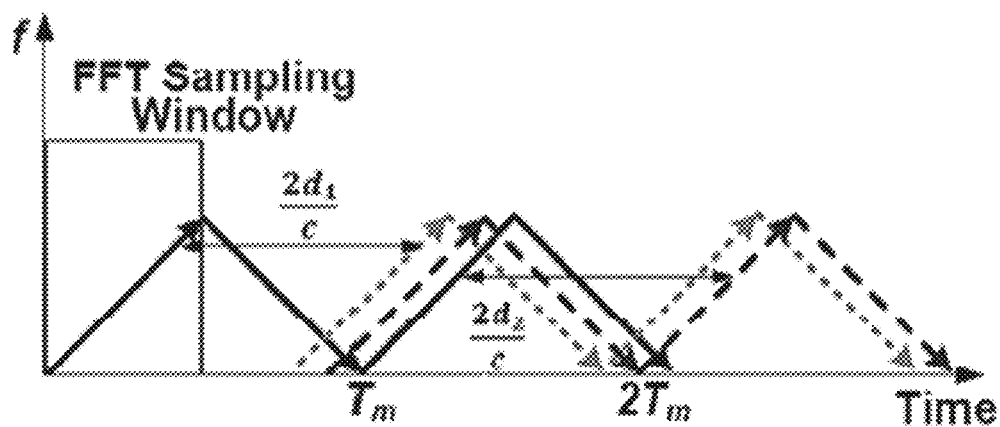
Figure 2F:
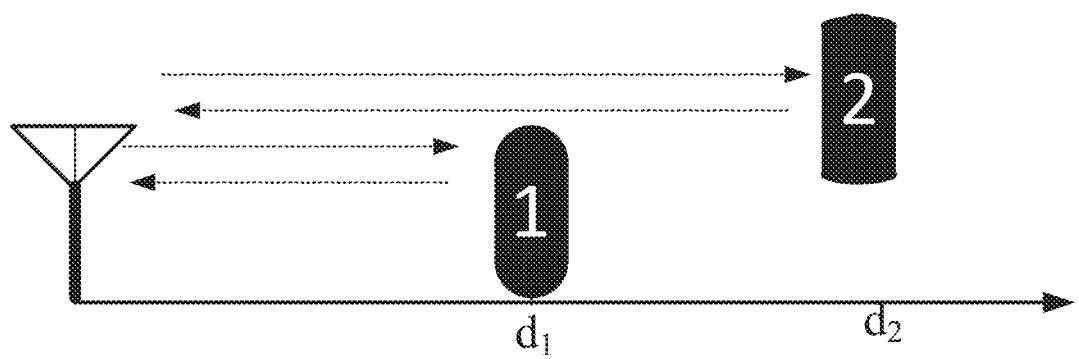
Figure 2G:
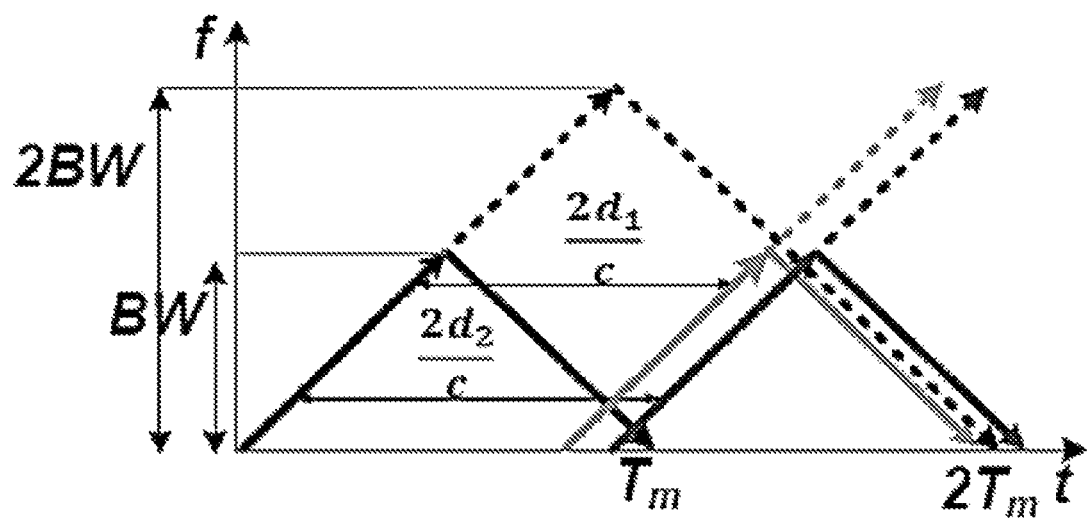
Figure 2H:
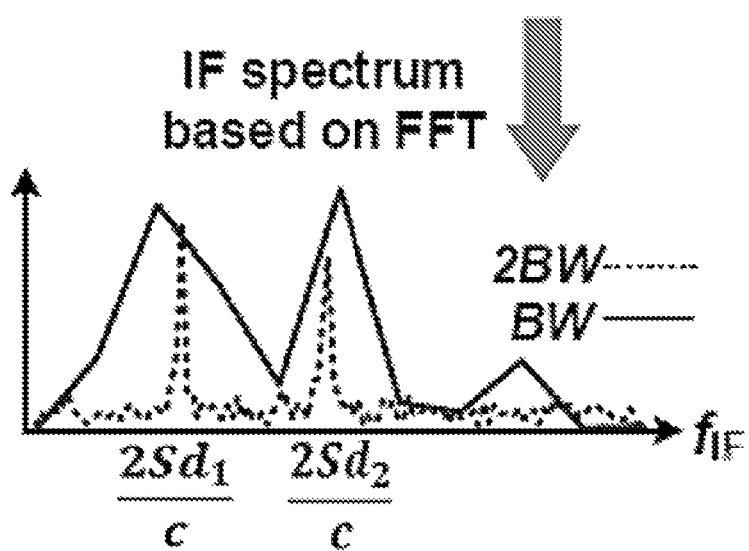

In practice, the transmitter of a FMCW radar sensor can illuminate multiple objects. In this scenario, the reflected signal from each object is received at the RX side with a delay which is proportional to the object's distance from the sensor (see FIGS. 2E-F). Each object's location is identified based on its corresponding IF frequency, which is conventionally derived by taking the fast Fourier transform (FFT) of the time-domain signal. To detect the locations of multiple objects, the corresponding IF peak associated with each object's location can be distinguished in the frequency spectrum. The frequency resolution of the FFT determines the spectral distinction of the IF peaks and is dependent on the width of the sampling time window, i.e., $T_m/2$. On the other hand, a larger $T_m$ leads to a longer unambiguous range. However, to increase $T_m$ without varying the frequency of IF signals (constant slope of S), the bandwidth of frequency sweep has to increase (as shown in FIGS. G-H). It is worth stating that increasing the sweeping time without increasing the bandwidth does not improve the sensor's distinction capability between the IF frequencies. The minimum spacing ($\Delta d$) between objects that an FMCW radar sensor can distinguish, known as range resolution, is $\Delta d=c/[2(f_H-f_L)]$, which is inversely proportional to the transmitted chirp bandwidth ($f_H-f_L$).

Figure 3A:
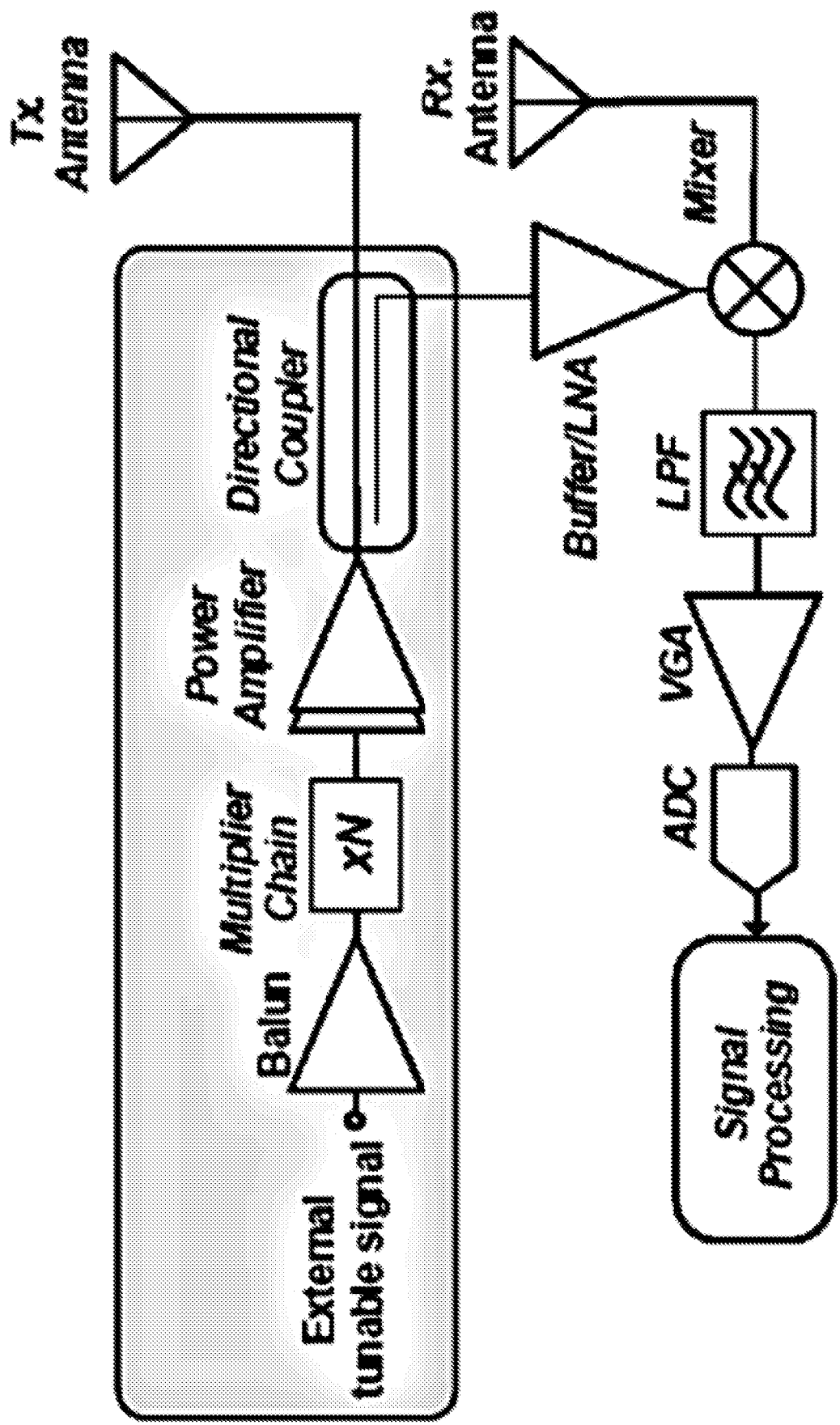
FIGS. 3A-B are diagrams illustrating existing implementations of FWCM radars.
Figure 3B:
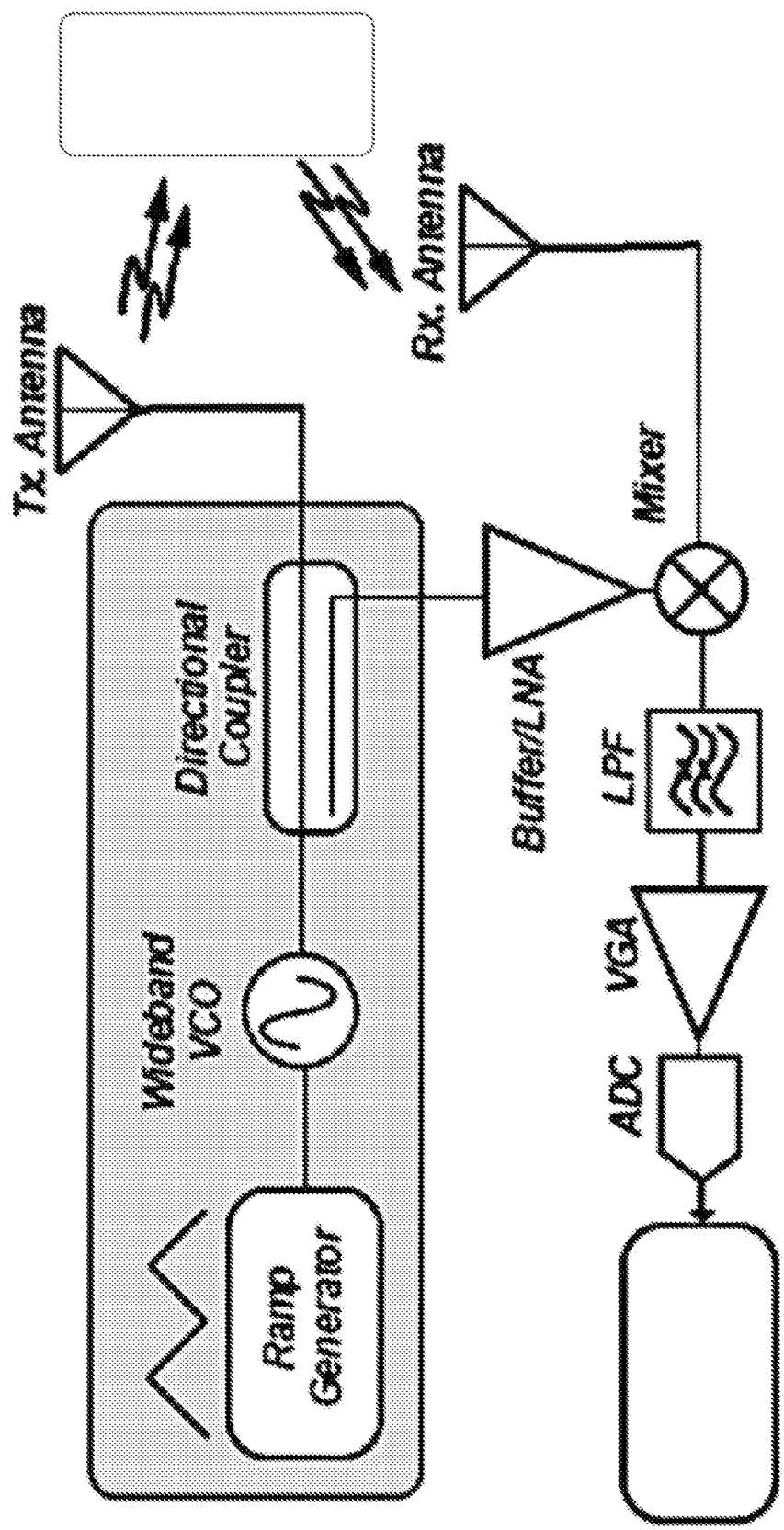

To achieve large bandwidths in silicon-based radar sensors, some convention systems raise the operation frequency well above W-band to accommodate a large absolute bandwidth. Conventional systems have also adopted two methods for chirp generation at such high frequencies, namely, frequency multiplication of an external tunable chirp (FIG. 3A) or tuning of a wideband voltage controlled oscillator (VCO) (FIG. 3B). However, as shown in chart 100, both propagation loss and passive component loss are extremely high at such high frequencies while the maximum output power of an active device is unacceptably low.

Thus, the current implementations of conventional wideband FMCW radar sensors encounter the several fundamental limitations. First, the generated power per element on the transmitter side is limited by the device $f_{max}$, which is below 400 GHz for commercially available silicon technologies. As a rule of thumb, operation frequencies below $f_{max}/2$ are usually considered to be the desired frequency range in order to attain acceptable level of transistor's power gain (e.g., >3 dB) and output power (e.g., >0 dBm). In order to cover targets at distances up to 50 m in local-area sensing zones, the transmit power and power efficiency of the radar sensor should be sufficiently high to overcome path loss and climate-dependent atmospheric attenuation. These notions imply that in contrast to prior arts target operation frequencies above $f_{max}/2$ with subpar performance, solutions that operate below $f_{max}/2$ are preferred.

Secondly, the operation of FMCW radar is sensitive to the chirp phase noise, which is significantly degraded as the operation frequency increases. This degradation is primarily due to lower quality factor of the passive components as well as higher intrinsic noise of the active devices at higher frequencies. Referring to FIG. 3A, despite the fact that low phase noise oscillation at low frequency is readily achievable, the output phase noise of the following x M multiplier is degraded by 10 log M. Therefore, the phase noise of transmitted chirp would be high. Similarly, the method in FIG. 3B essentially suffers from the low-quality factor of tuning components (e.g., varactors) inside the oscillator tank which does not allow for low phase noise fundamental/harmonic signal generation. Although VCOs based on inductive tuning show promising performance and are more amenable to high-frequency operation compared to varactor-based counterparts, their tuning range is narrow and thereby limiting their use for wideband chirp generation.

Thirdly, the receiver in any active sensing system receives an attenuated version of the transmitted signal and the capability of the receiver to interpret the information of incoming weak signals depends on its sensitivity. For frequencies above $f_{max}/2$, the noise figure of the front-end building blocks within the receiver increases. Therefore, designing a receiver with acceptable sensitivity for multimeter target range becomes extremely challenging.

Lastly, the range resolution of FMCW radars is determined by the bandwidth of the transmitted chirp. For a fully integrated implementation of existing FMCW radar architectures shown in FIGS. 3A-B, wideband VCOs with high output power and low variation of power across wide bandwidth need to be designed. To maintain the oscillation power across the tuning range, the quality factor of the oscillator should remain independent of that of the varactors. This means that the varactor capacitance can be a small portion of overall tank capacitance, limiting the tuning range. A wideband signal generation scheme without the trade-off between the output power and tuning range is needed to achieve the desired range resolution.

To address the above issues, a scalable synthetic wideband stepped chirp radar sensor is disclosed, which can be employed for long-range and high-resolution sensing in local-area infrastructures.

Stepped-Chirped Sensor

Disclosed herein is a novel radar sensor system and method (hereinafter "the disclosed radar system" or "the system") with local-area sensing zones that can be implemented efficiently between 90 to 200 GHz using the commercially available silicon technologies. This enables the system to be scalable and to have a low-power and a small footprint. The disclosed radar system can adopt the popular frequency modulated continuous wave (FMCW) radars and incorporate new techniques to enhance the resolution and operation range of the active radar sensor. The disclosed radar system is configured to operate in a wide synthetic bandwidth and render high range resolution, both of which are critical to the deployment massive networks of active radar sensors. The receiver in the disclosed radar system does not suffer from the challenges of conventional wideband receivers as it combines the intermediate frequency (IF) components of multiple narrowband receivers to achieve the millimeter-scale range resolution. Moreover, the scalability of the disclosed radar system enables it to be deployed in large arrays of antennas. In this manner, an improved angular resolution can be achieved. Lastly, the operation frequency of the disclosed radar system enables millimeter level cross-range resolution. This enables accurate estimation of the location and/or velocity of the objects within the local-sensing range (and beyond).

The disclosed radar system includes a stepped chirp sensor configured to operate as synthetic wideband systems with high resolution but with benefits of narrowband systems in terms of power efficiency and noise figure.

The disclosed system can employ phase-locked loops that are easily designed and without the need to limit the frequency range of the sub-chirps (due to the challenges of high frequency phase-locked loops). The receiver of the disclosed system has the benefit of narrowband operation at each sub-chirp, which reduces the noise figure, enhances power, and preserves a linear chirp profile.

Figure 4A:
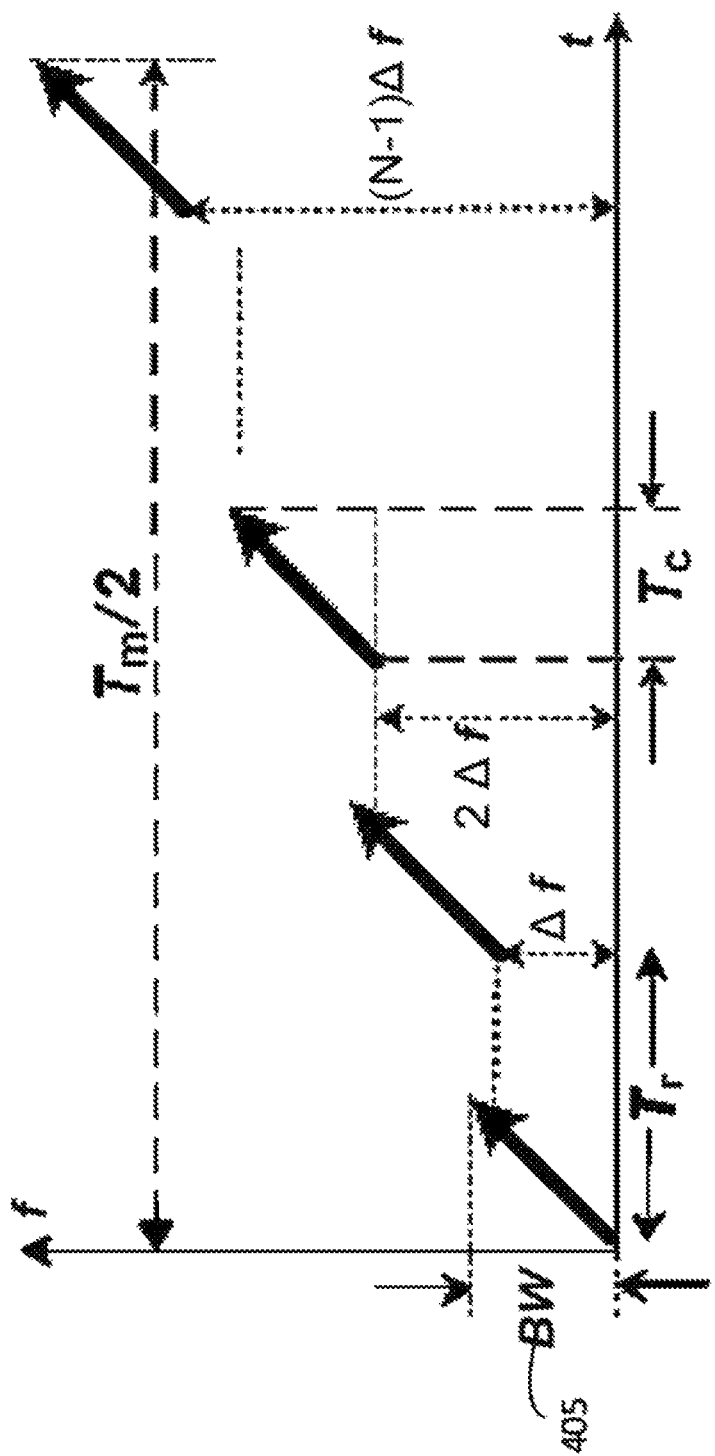
FIG. 4A is a graph illustrating the waveform of a synthetic wideband stepped chirp system in accordance with some embodiments of the present disclosure.

The transmitter of the disclosed system is developed based on the principle of synthetic wideband stepped chirp waveform generation, which is conceptually shown in FIG. 4A. In some embodiments, the synthetic stepped chirp of the disclosed system can include N sub-chirps. Each sub-chirp has a corresponding-local bandwidth of BW 40, which can have a rising half-period ($T_m/2$) followed by N sub-chirps in the falling half-period (not shown in the figure). Each sub-chirp can be swept within $T_c$ seconds and the time spacing between the starting points of consecutive sub-chirps can be $T_r=T_m/2N$. The starting frequencies of two consecutive sub-chirps, $f_{s,i}$ and $f_{s,i+1}$, hold a frequency difference of $\Delta f$, which can be $\leq BW$ to avoid interspaces in the synthetic spectrum. In this way, the disclosed system covers a total synthetic frequency bandwidth of $BW_T=(N-1)\Delta f+BW \geq N\Delta f$. In this configuration, $T_r$ and accordingly $T_c$ can be short relative to the time elapsed during the target location change to ensure that each sub-chirp illuminates the same target.

Figure 4B:
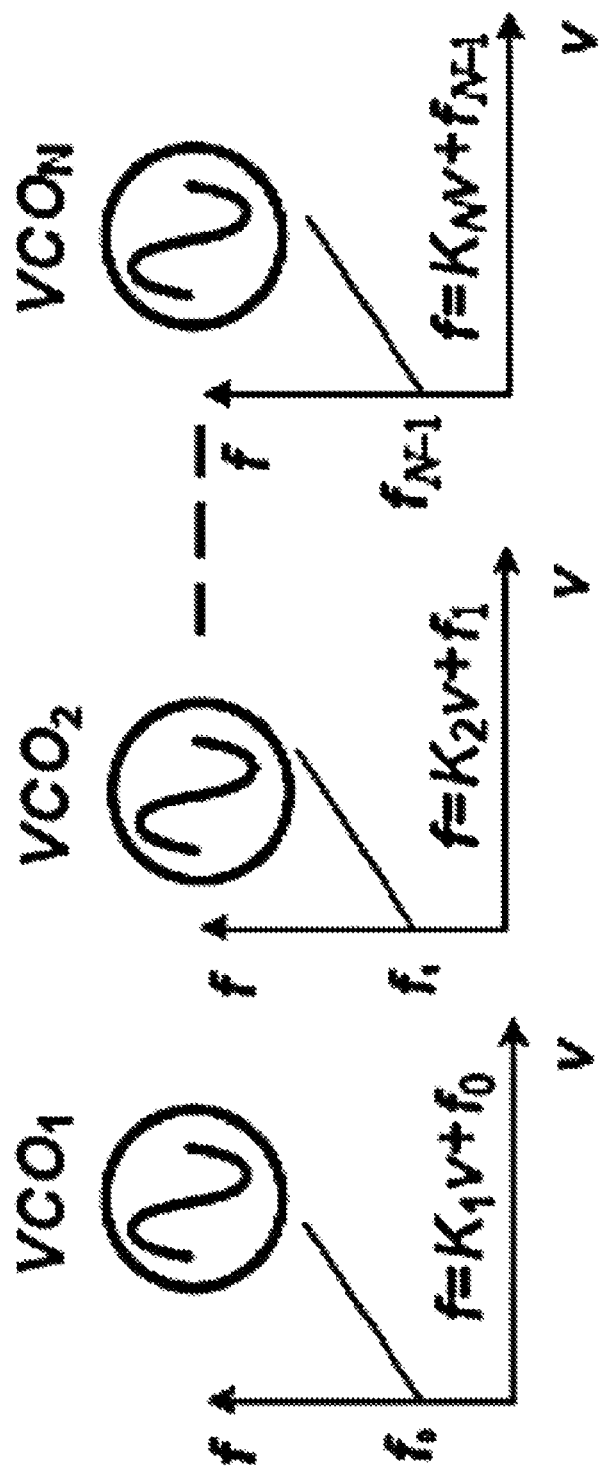
FIG. 4B is a chart illustrating a stepped chirp system implemented with free running voltage control oscillators (VCOs).

Using the stepped-chirp waveform generator, the disclosed radar system can achieve a range resolution of $C/(2BW_T)$ if the slopes of sub-chirps are all identical or similar. This requirement is challenging to meet in practice if the stepped chirp is designed based on free-running VCOs, as shown in FIG. 4B. As mentioned, wide tuning-range VCOs suffer from large power variation across the tuning range since each oscillator needs to cover relatively small bandwidth of BW as oppose to the larger bandwidth of $BW_T$ (synthetic frequency bandwidth). As such, there is little variation of power across each sub-chirp's bandwidth. However, the $K_{VCO}=2\pi\Delta f/\Delta v$ of free-running VCOs can be identical to obtain the same slopes for the sub-chirps, which is feasible when frequency-tuning components inside the VCOs are unidentical. Accordingly, due to the high sensitivity of passive and active components to the process variations, generation of sub-chirps with identical slopes by employing multiple free-running VCOs is not practical.

Figure 5A:
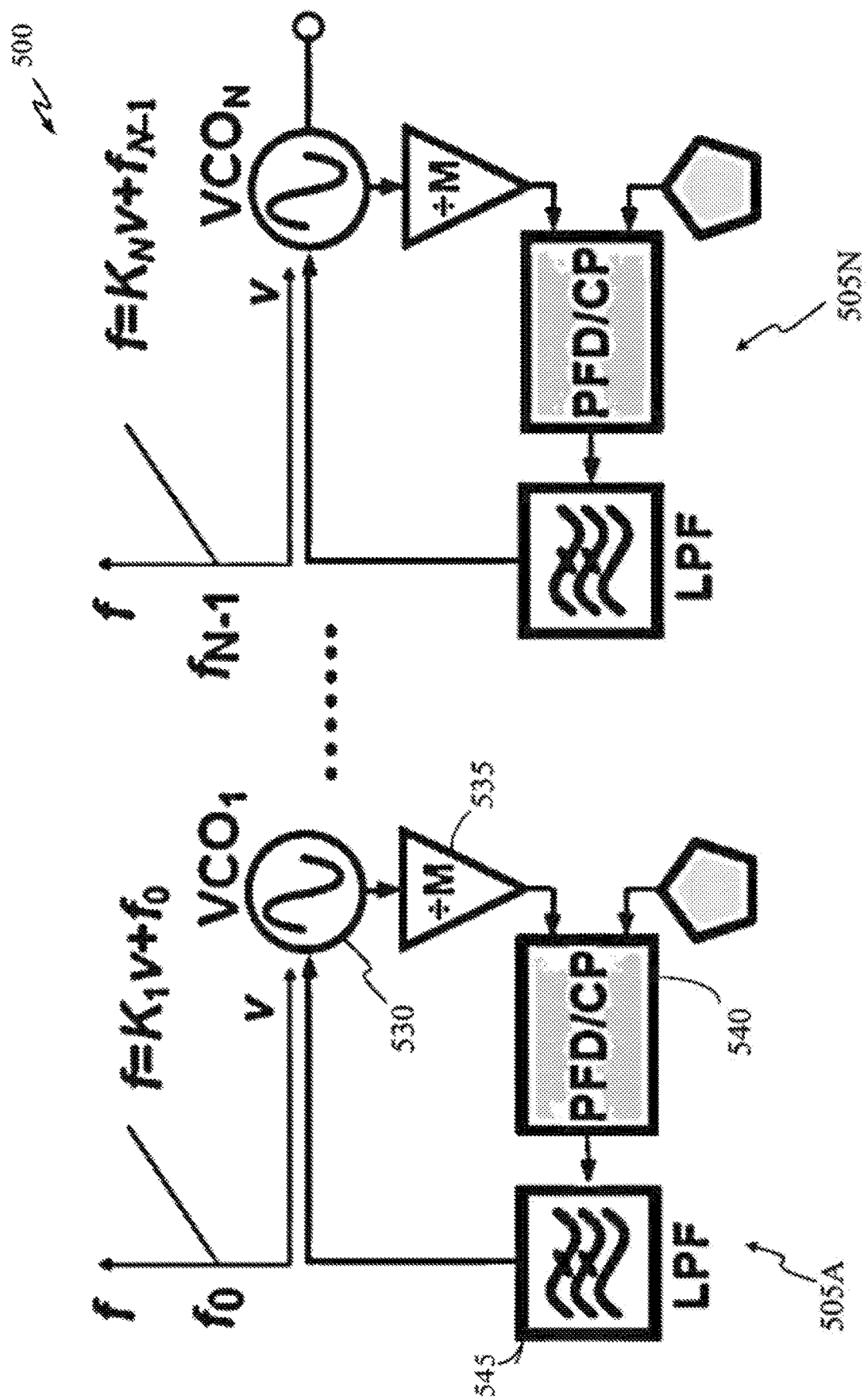
FIGS. 5A-B are block diagrams a stepped-chirp radar system in accordance with some embodiments of the present disclosure.

FIG. 5 is a diagram illustrating a type-II phase-locked loop (PLL) 500 (e.g., stepped-chip waveform generator) in accordance with some embodiments of the present disclosure. PLL 500 can resolve the variations of free-running oscillators by minimizes frequency and/or phase fluctuations and can significantly reduce phase noise at close-in offset frequencies. Lower phase noise can improve the accuracy of a radar sensor for short-range operations. As shown in FIG. 5A, a plurality of independent PLLs 505A, 505N can be employed to ensure that each constituent VCO operates at the desired frequency range and with the desired $K_{VCO}$. Each PLL (e.g., PLL 505A) includes a dual-voltage controlled VCO (e.g., 530, 700), a frequency divider 535, a phase frequency detector (PFD) 540, a low-pass filter 545. The output of the dual-voltage controlled VCO is inputted into the frequency divider, which has an output being coupled to the input of PFD 540. The output of LPF 545 can be used as one of the input control voltages of the dual-voltage controlled VCO.

In PLL 500, N sub-chirps are generated by N PLLs. Higher frequency sub-chirps require higher frequency PLLs, where the design of divider chain can be challenging. Additionally, N reference sources at different oscillation frequencies are required, given the same division ratio among the loops, which adds to the design complexity. To overcome these design challenges, another PLL scheme is disclosed.

Figure 5B:
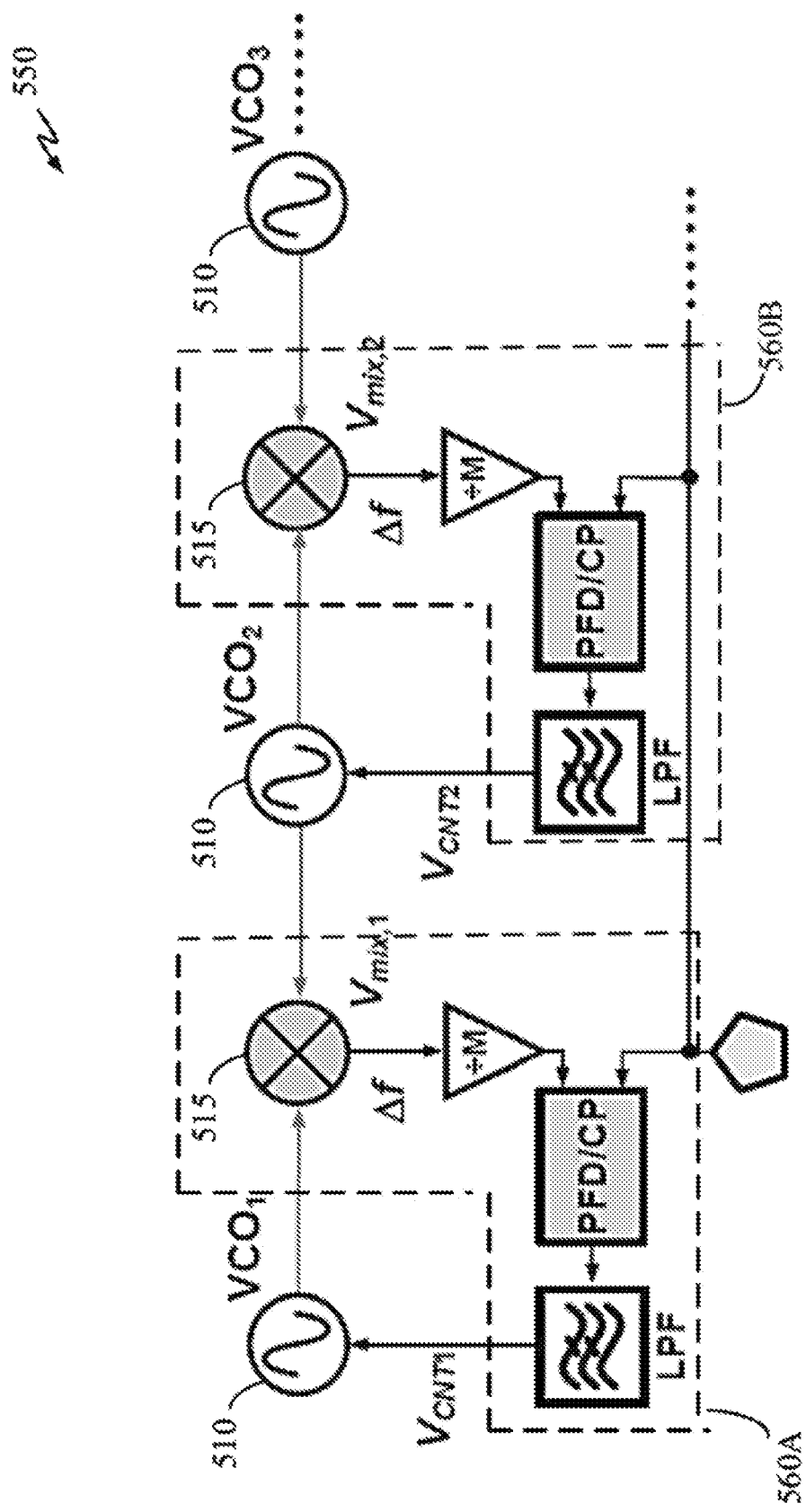

FIG. 5B illustrates a PLL array 550 in accordance with some embodiments of the present disclosure. As shown, PLL array 550 includes a plurality of mixing PLLs 560s. In PLL array 550, the outputs of each pair of adjacent VCOs 510s are fed to a mixer 515. Under the locking condition, the output of the $i^{th}$ mixing PLL (e.g., 560A) is locked to the mixer's difference frequency ($\Delta f$) component, where $V_{mix,i} = A \cos[(\omega_i + 1 \ \omega_i)t + \Phi_{i+1} \ \Phi_i]$, where $\Phi_i$, $\Phi_{i+1}$ and $\omega_i$, $\omega_{i+1}$ are the instantaneous phases and radian frequencies of the $i^{th}$ and $(i+1)^{st}$ VCO, respectively. By placing the mixer inside the loop of the type-II PLL, the mixing spurs are substantially reduced. As will be illustrated below, the unique attributes of this mixing-PLL architecture make a favorable choice for a wideband radar sensor based on stepped-chirp waveform.

PLL array 550 is configured such that the plurality of mixing PLLs 560s are all locked to the same frequency. However, this does not guarantee the synchronized sweep of their corresponding sub-chirps. The synchronized sweep is essential to guarantee that all the sub-chirps have the same slope. To allow for synchronized frequency sweep of the VCOs, a master-slave operation among the PLLs is employed. Rather than applying it to one of the VCOs, the control voltage of each mixing PLL (in PLL array 550) applies to both VCOs driving the constituent mixer.

Figure 6A:
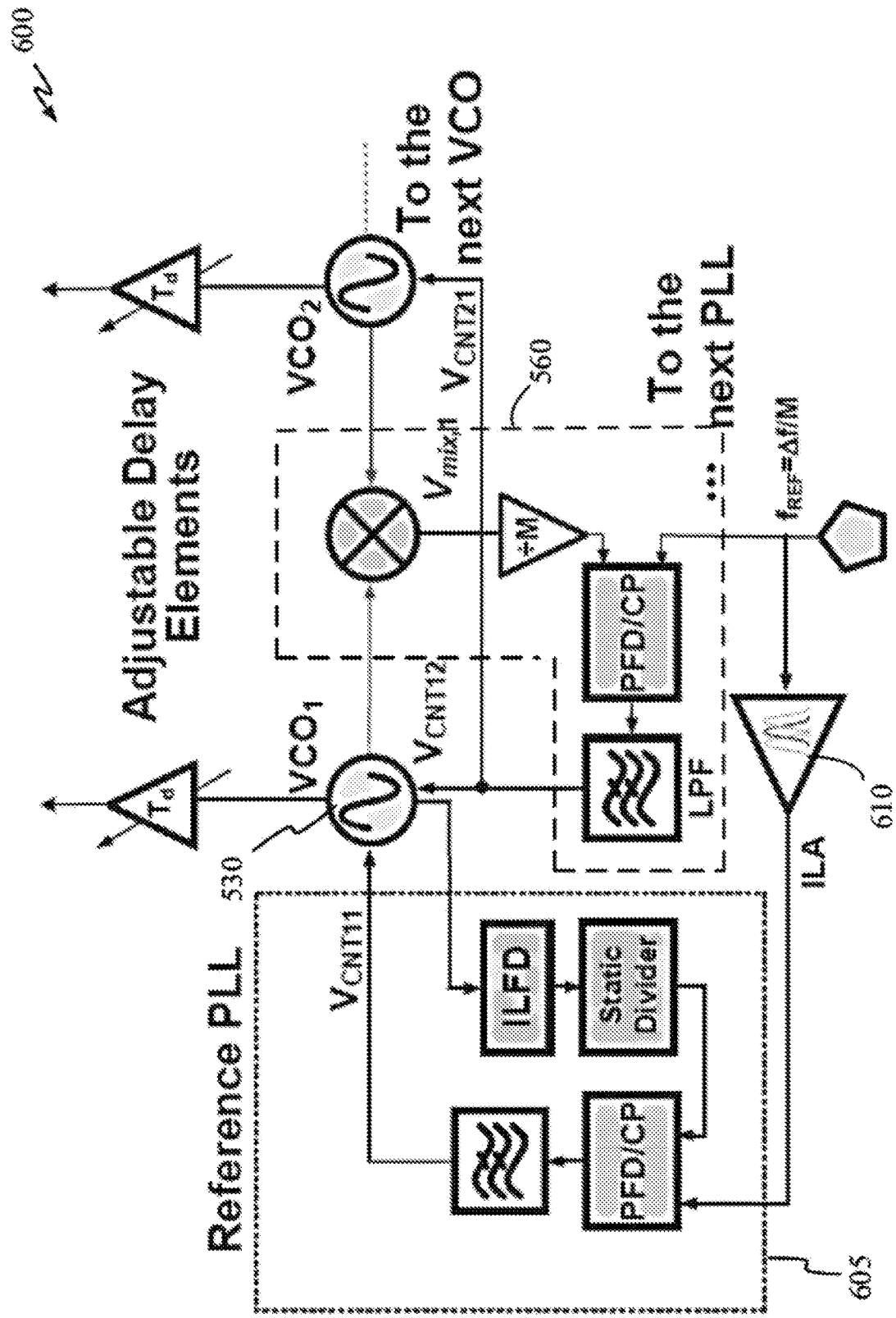
FIG. 6A is a block diagram illustrating a stepped-chirp transmitter in accordance with some embodiments of the present disclosure.

FIG. 6A illustrates a PLL assembly 600 that incorporates one or more mixing PLLs in accordance with some embodiments of the present disclosure. In assembly 600, adjacent PLLs are configured to sense each other's frequency variations and operate cooperatively. Additionally, to cover the synthetic bandwidth ($BW_T$), the start and stop frequencies of each sub-chirp can be precisely defined and controlled. To this end, a reference PLL 605 can be used to precisely define the frequency of the first VCO while one or more mixing PLLs 560 subsequently enforce the precise frequencies of the following VCOs. Frequency sweeping of each sub-chirp is realized in reference PLL 605 by varying its input frequency, which is accomplished by feeding the reference to an injection-locked amplifier (ILA) 610.

In some embodiments, the architecture of the above PLL assembly (e.g., 550, 600) can have three operational phases. In phase 1, the precise frequency of each VCO is defined and the fixed frequency difference among the sub-chirps is enforced. This can be done using a reference PLL (e.g., PLL 605). The frequency of the first VCO (corresponding to the lowest frequency sub-chirp) can be set by the reference PLL (e.g., 605) and through $V_{CNT1,1}$. The N−1 mixing PLLs (e.g., PLL 560) enforce the fixed frequency difference of the adjacent sub-chirps. The phase-1 operation happens only once every time the radar sensor is turned on.

Figure 6B:
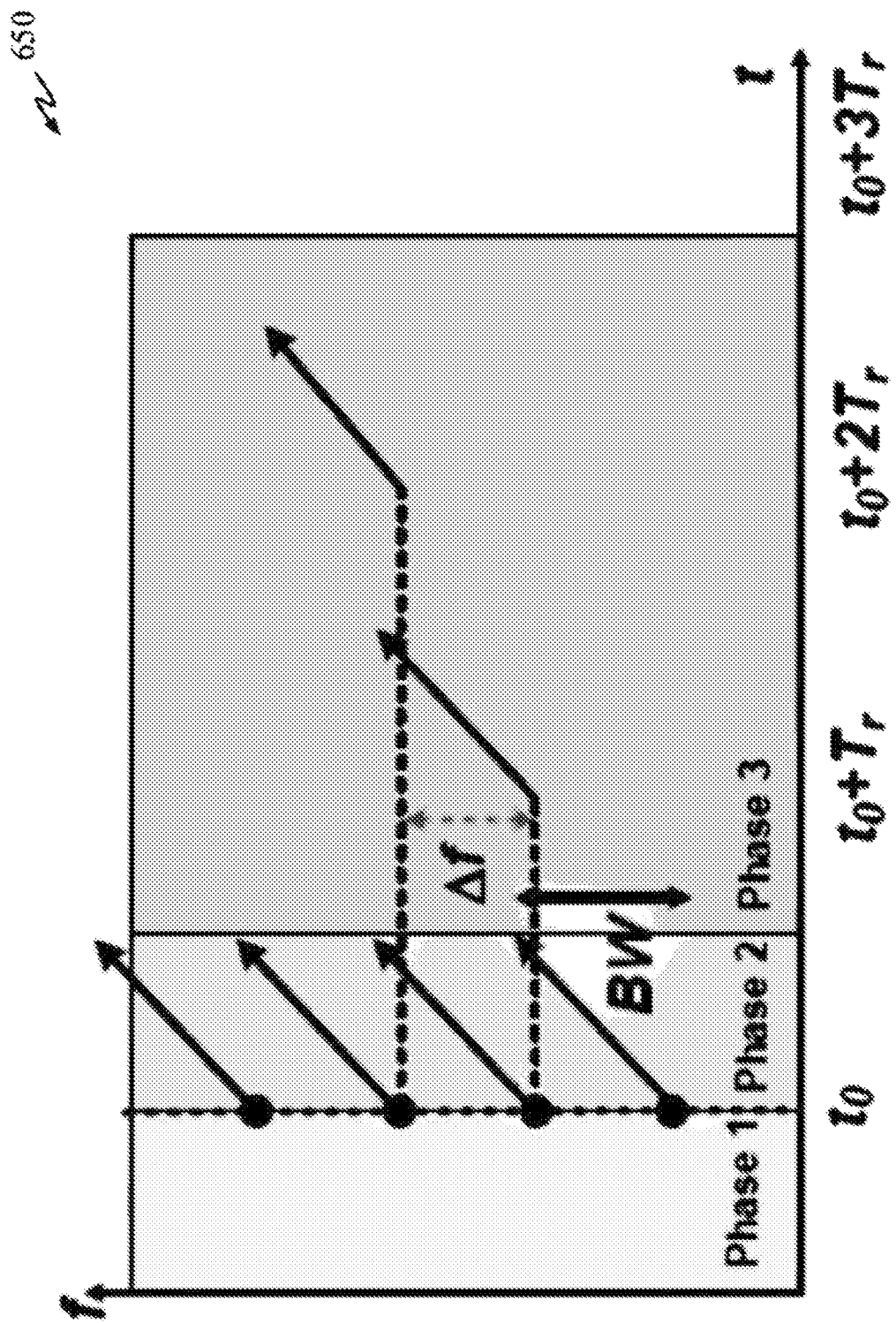
FIG. 6B is a graph illustrating a chirped frequency waveform of a stepped-chirp transmitter in accordance with some embodiments of the present disclosure.

In phase 2, sweeping frequencies of the subchirps (with the same slopes: $VCO_i$, $2 \leq i \leq N$) in the proposed scheme has two control voltages, $V_{CNTi,2}$ and $V_{CNTi,1}$, coming from the $i^{th}$ and the $i-1^{st}$ mixing PLLs (e.g., 560), respectively. Meanwhile, VCO 530 is controlled by the reference PLL (e.g., 605) and the first mixing PLL (e.g., 560), see for example FIG. 6A. Referring to system's frequency-time plot 650 in FIG. 6B, right after phase 1 at $t = t_0^+$ all mixing PLLs are locked and the ILA sweeps the input frequency of the reference PLL, which, in turn, sweeps the frequency of VCO 530 within sweeping duration, $T_c$. The mixing PLLs follow the frequency variation of VCO 530 to enforce the fixed frequency difference $\Delta f$ between any two adjacent VCOs. Since all mixing PLLs' output frequencies are identical and each VCO is simultaneously controlled by two adjacent PLLs, the frequency sweep of all VCOs is perfectly aligned with that of VCO 530. Therefore, the synthesized sub-chirps during this phase of operation exhibit identical slopes, as shown in FIG. 6B.

In phase 3, sub-chirps with identical time-spacings are spread. Upon synthesis of linear sub-chirps, the voltage-controlled delay elements in FIG. 6A will then spread the stepped sequence of sub-chirps in time with spacing of $T_r$. These delay elements adjust $T_r$ with respect to the maximum unambiguous range of operation when being used in a radar sensor.

Figure 7A:
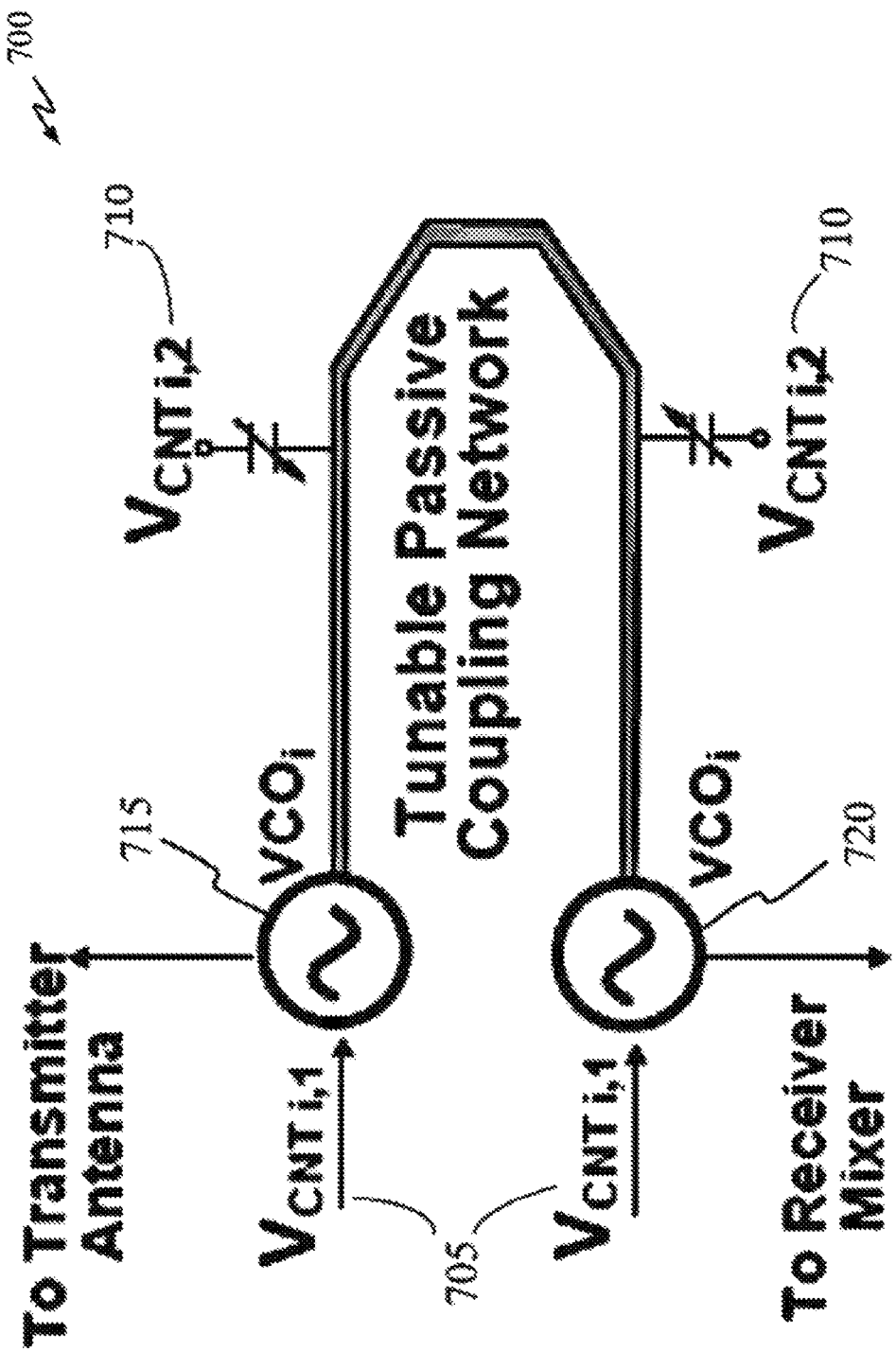
FIGS. 7A-C are block diagrams illustrating one or more architectures of a dual voltage control oscillator in accordance with some embodiments of the present disclosure.

FIG. 7A is a diagram illustrating the architecture of a VCO 700 with two in independent control voltages in accordance with some embodiments of the present disclosure. VCO 700 includes a network of two coupled oscillators, each core oscillator incorporates a local tuning mechanism controlled by $V_{CNTi,1}$ 705. The second tuning mechanism is provided by the coupling network controlled by $V_{CNTi,2}$ 710. According to Adler's equation, varying the phase shift of the coupling network $\Phi_c$ leads to the corresponding frequency tuning in VCOs 715, 720. The phase equation is:

$$\dot{\phi}_1 = \omega_0 + k \sin(\phi_2 + \phi_c - \phi_1) \text{ and } \dot{\phi}_2 = \omega_0 + k \sin(\phi_1 + \phi_c - \phi_2) \quad (1)$$

where $k = \omega_0 I_{inj}/(2QI_{core})$ is the injection coefficient between the VCOs (e.g., 715, 720), $\Phi_c$ is the phase shift introduced by the coupling network, $\Phi_1$ and $\Phi_2$ are the instantaneous phases and $\omega_0$ is the free-running frequency of the oscillators.

Figure 7B:
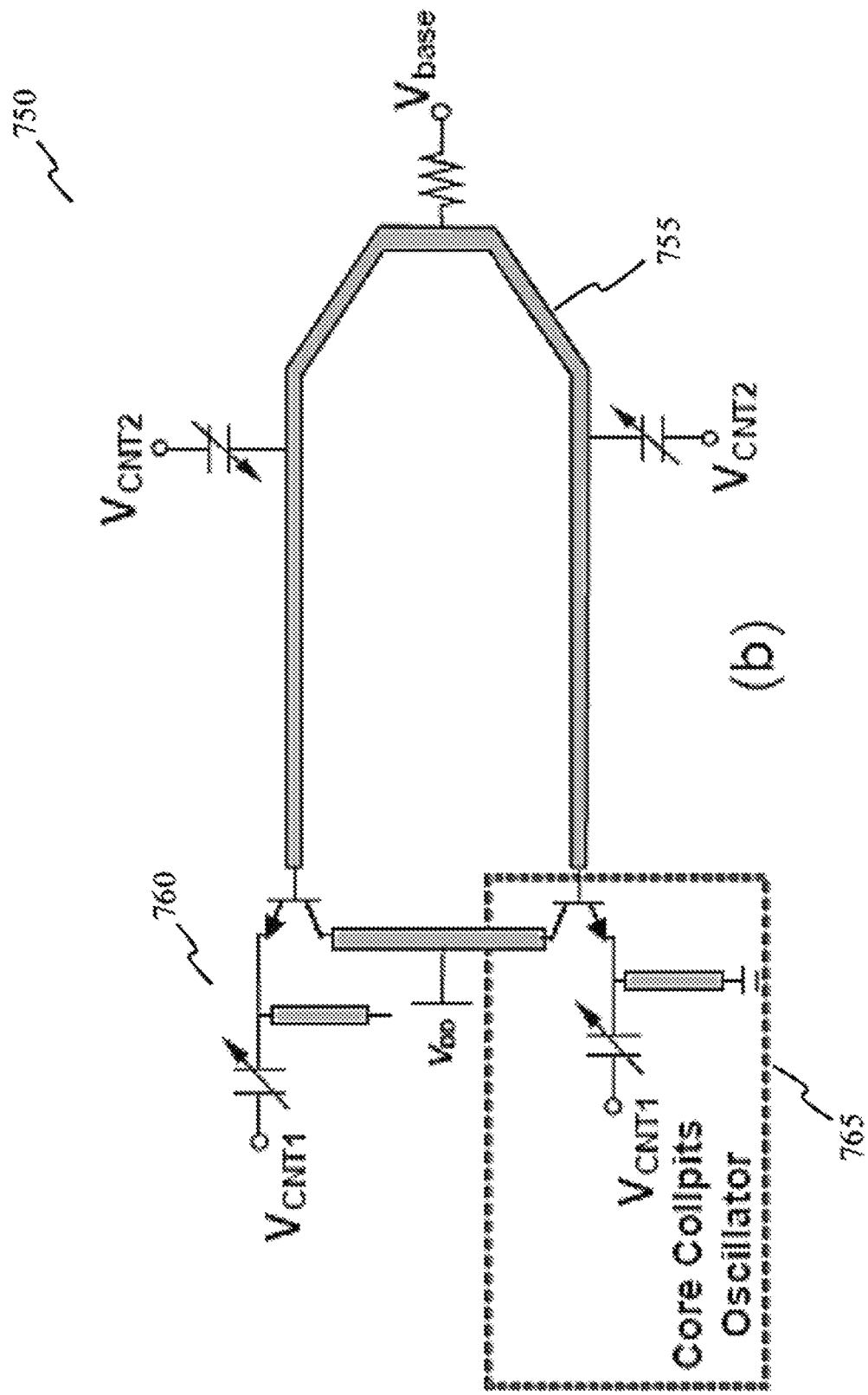

Furthermore, $I_{inj}$ is the external current being injected to each oscillator, while $I_{core}$ is the inherent circulating current inside the oscillators. According to equation (1), varying $\Phi_c$ using the varactors within the coupling network will result in concurrent variation of oscillation frequencies. The coupled operation of the two oscillators also lowers the phase noise by 3 dB. FIG. 7B illustrates coupled oscillator 750 in accordance with some embodiments of the present disclosure. VCO 700 can have one or more features of coupled oscillator 750 as described below. In some embodiments, coupled oscillator 750 can have a 55 nm SiGe BiCMOS topology. Coupled oscillator 750 is configured to be tunable and high-power sub-chirps. The tuning frequency range of coupled oscillator 750 can range between 61-242 GHz and 1.8 dBm of peak output power.

As shown in FIG. 7B, coupled oscillator 750 includes a tunable coupling 755 between the two oscillators (760, 765).

This configuration provides several major advantages: 1) a compact implementation of odd-mode coupling between the two oscillators; 2) maximum tuning range from the passive coupler due to the existence of large impedances at the base terminals, 3) the odd-mode coupling enforces voltage antinodes at the base terminals which maintains the large fundamental and harmonic swing at the base, and 4) the odd-mode coupling of the second harmonic signals leads to a constructive summation at the output matching network which results in a high DC-to-RF efficiency for the second harmonic.

Figure 7C:
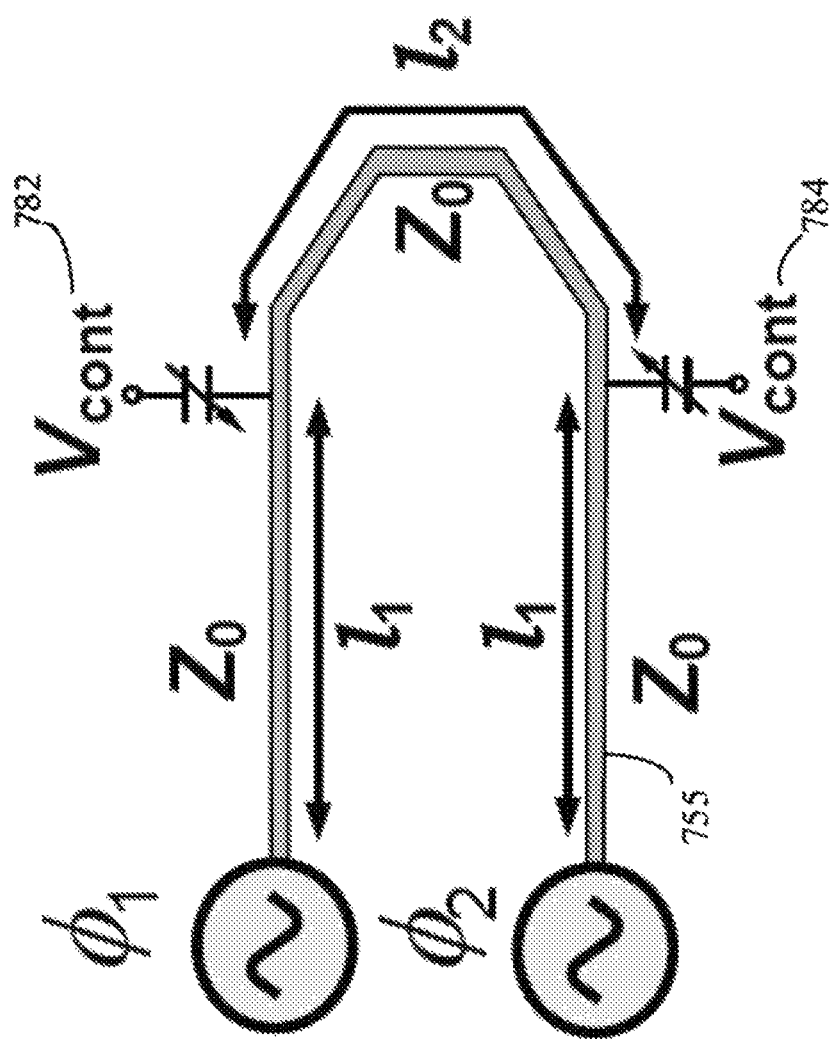

FIG. 7C illustrates a tunable coupling 780 in accordance with some embodiments of the present disclosure. Tunable coupling 780 includes two varactors 782, 784 coupled on each side of transmission line 755. The frequency tuning of coupling 780 can be controlled using phase variation by changing the varactor from $C_{min}$ to $C_{max}$.

Figure 8:
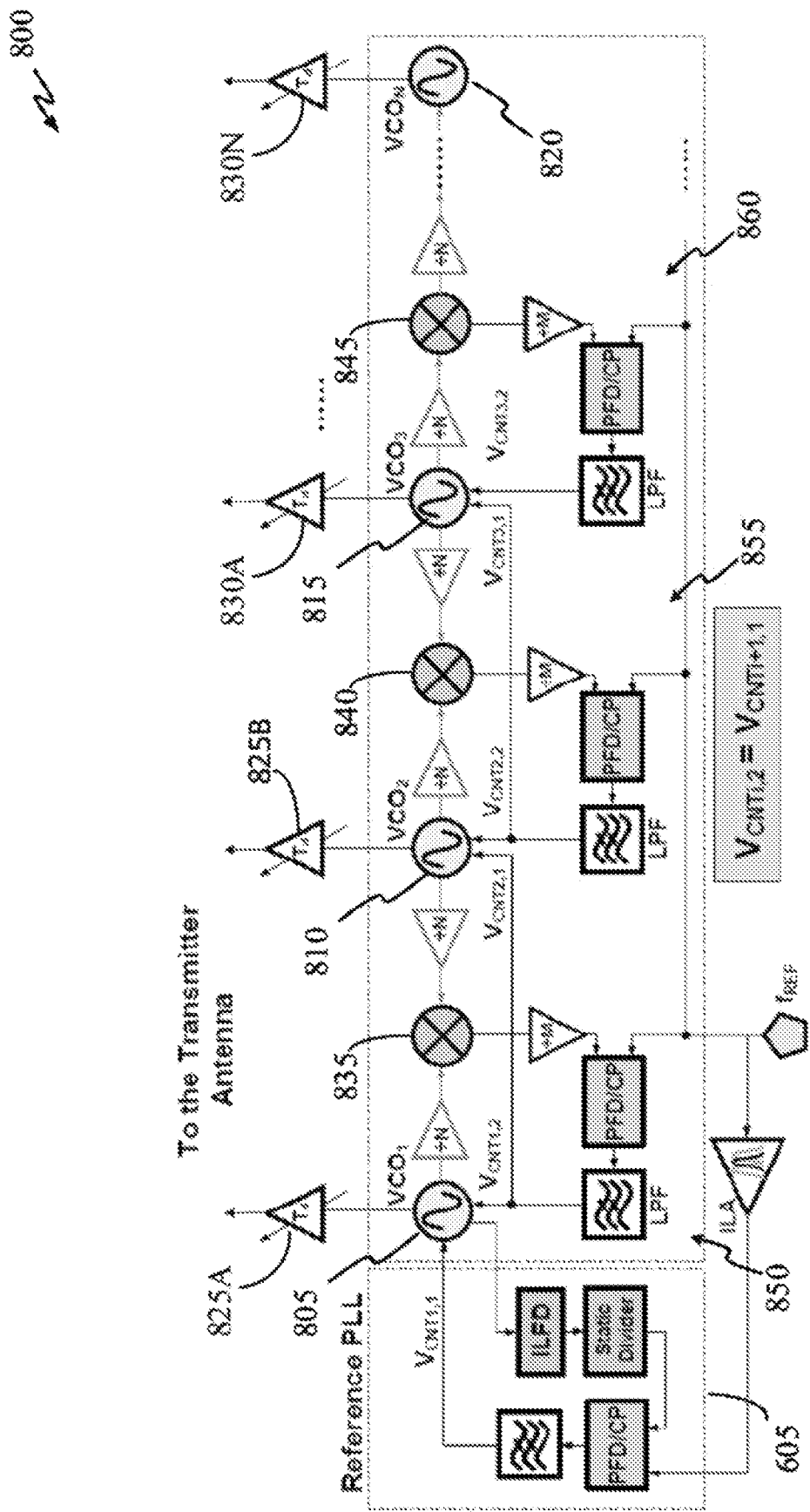
FIG. 8 is a block diagram illustrating a stepped-chirp transmitter in accordance with some embodiments of the present disclosure.

FIG. 8 illustrates a phase-locked stepped chirp transmitter 800 in accordance with some embodiments of the present disclosure. Transmitter 800 can include two coupled oscillators for each sub-chirp circuit (e.g., 850, 855, 860). For example, oscillators 805, 810 can be coupled to the first sub-chirp circuit. Oscillators 810, 815 (or 815, 820) can be coupled to the second sub-chirp circuit. This enables one of the oscillators to provide the input signal to the corresponding transmitter antenna (not shown) while the other will feed the receiver mixer (e.g., 835, 840, 845). The tunable delay elements (e.g., 825, 830) provide temporal spacing of $T_r$ between the transmitted sub-chirps. The mixing PLLs' operation frequencies in this scheme are the same and independent from the frequency of the sub-chirps, thereby making this architecture amenable to high frequencies.

Proposed Cooperative Stepped Sub-Band Receiver Array

The underlying operation principle of the stepped-chirp radar sensor lends itself to the possibility of deploying an array of stepped sub-band receivers. Each sub-band receiver can be dedicated to one sub-chirp as oppose to having a single wideband receiver across the entire synthetic bandwidth. To better understand the operation principle of the dedicated sub-band receiver, the stepped-chirp signal model is adopted to derive equations (2)-(6), and assuming an N transmitted sub-chirps. The stepped-chirp model can be represented as:

$$S_i(t) = s(t - iT_r) \cdot \exp[j2\pi(f_0 + i\Delta f)(t - iT_r) + j\theta_i] \quad 0 \le i \le N-1, \quad (2)$$

where $s(t) = \text{rect}(t/T_c) \cdot \exp(j\pi S t^2)$, $\text{rect}(.)$ is the rectangular function, $S = BW/T_c$ and $\theta_i$ are the slope and the initial phase of each sub-chirp, respectively. For a target with a reflection coefficient $\sigma_0$ at a distance R from the radar sensor, the reflected components of the sub-chirps are $$R_i(t,R) = \sigma_0 s(t - 2R/x) \cdot \exp[j2\pi(f_0 + i\Delta f)(t - iT_r - 2R/c) + j\theta_i]$$
$$0 \le i \le N-1. \quad (3)$$

In a reflection-based radar receiver, the IF component is generated by finding the correlation between the transmitted signal and the reflected signal from the target, i.e., $$D_i(t', R_0) = S_i(t) * R_i(t, R_0) \quad (4)$$

$$= \sigma_0 \text{rect}(t' | -2R_\Delta/c) \exp[-j(4\pi S/c)R_\Delta t'] \cdot$$
$$\exp[j(4\pi S/c^2)R_\Delta^2] \cdot$$
$$\exp[-j(4\pi/c)(f_0 + i\Delta f)R_\Delta],$$

where $t' = t - iT_r - 2R/c$, $R_\Delta = R - R_0$. The range resolution can be defined as the minimum distinguishable distance between the actual target at R and a virtual reference point at $R_0$ (could be the location of the second object).

$$D_i(R,\omega) = T_c \,\text{sinc}[T_c(\omega + (4\pi S/c)R_\Delta)] \cdot \exp[-j(2R_\Delta/c)(\omega + (4\pi S/c)R_\Delta)] \cdot \exp[-j(R_\Delta/c)T_c\omega] \cdot \exp[-j(4\pi S/c^2_\Delta R^2)] \cdot \exp[-j4\pi/c(f_0 + i\Delta f)R_\Delta]. \quad (5)$$

To obtain the spectral information, which determines the range of the target, the Fourier transform of Eqn. (4) is derived. The peak value of $D_i(R, \omega)$ occurs (corresponding to the target distance) at $\omega_R = (4\pi S/c)R_\Delta$. Since all sub-chirps have the same slope, they will have identical $\omega_R$. Additionally, at $\omega_R$, the N Fourier components in Eqn. (5) represent vectors in the complex plane with identical magnitudes and constant phase spacing of $4\pi/c(\Delta f\, R_\Delta)$. It is readily shown that the N Fourier components in Eqn. (5) at $\omega_R$ represent the DFT of an N-point range profile of an object at distance R. Therefore, by taking the inverse DFT (IDFT) with respect to i, the corresponding N-point range profile can be obtained, i.e., $$W(n) = W_0 \sum_{i=0}^{N-1} D_i(R, \omega_R) \exp(j2\pi in/N) = \quad (6)$$

$$W_0 \frac{\exp[-j(m - 2\pi n/N)N/2]}{\exp[-j(m - 2\pi n/N)/2]} \frac{\sin((m - 2\pi n/N)N/2)}{\sin(m - 2\pi n/N)},$$

where $W_0$ is a constant and $m = (4\pi/c)R_\Delta \Delta f$. The location of the maximum in Eqn. (6) is $n = mN/2\pi = 2NR_\Delta \Delta f/c$ and by dividing it by $2N\, \Delta f/c$ the updated high range resolution location of the target is obtained. Intuitively, Eqn. (6) implies that larger number of sub-chirps (e.g., larger bandwidth) increases the size of the range profile. This means that the spatial resolution of the radar sensor (range resolution) is improved.

Figure 9:
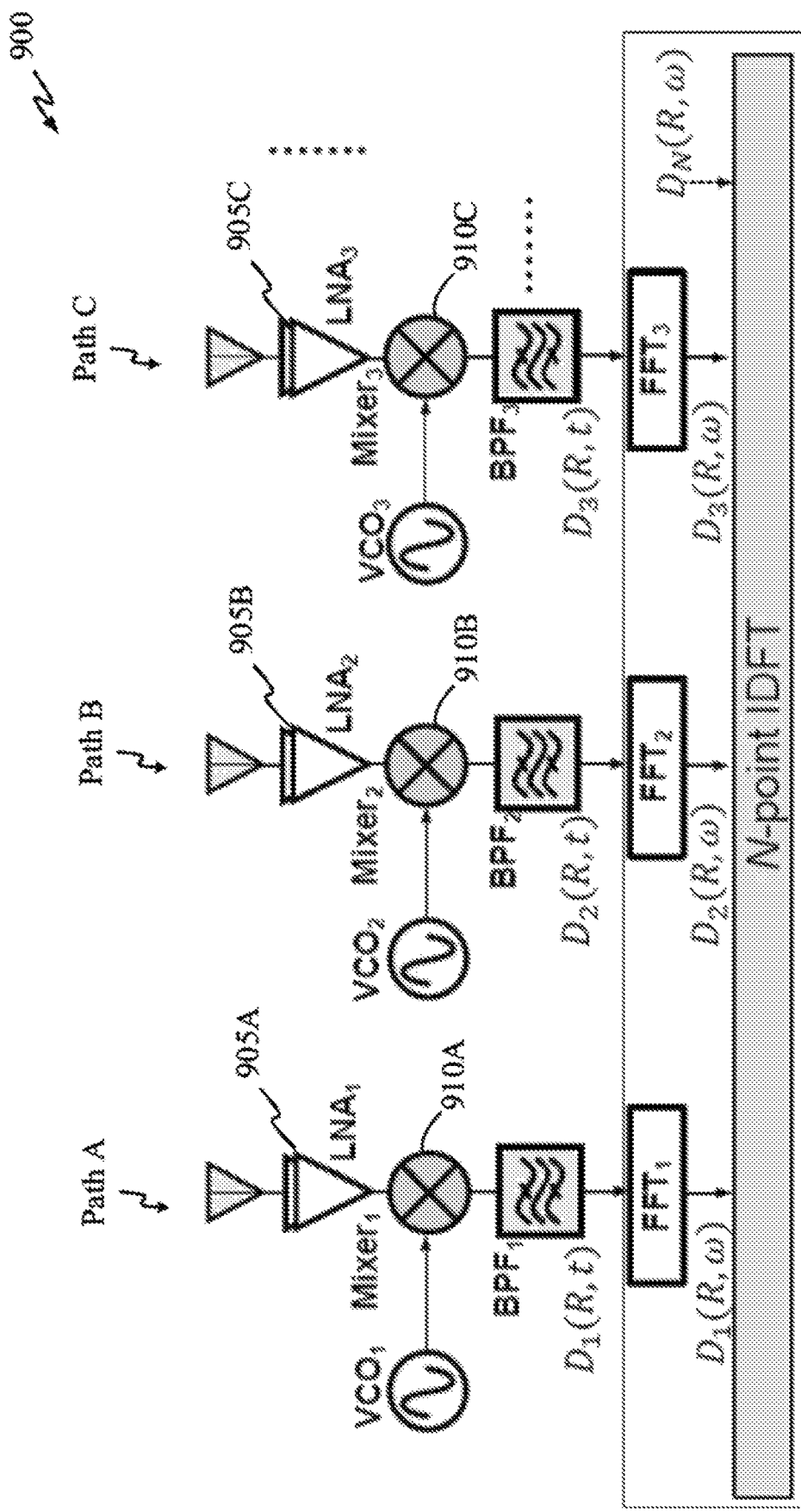
FIG. 9 is a block diagram illustrating a sub-band receiver array in accordance with some embodiments of the present disclosure.

Among two possible implementations of a single wideband receiver and N narrowband receiver elements (e.g., N-antenna) corresponding to the N sub-chirps, the latter is preferred. The N-antenna solution exhibits multiple advantages such as, but not limited to, lower signal loss and better sensitivity. FIG. 9 is a diagram of a receiver 900 having a plurality of narrowband receiver elements in accordance with some embodiments of the present disclosure.

Upon reception and low-noise amplification of the reflected component of each sub-chirp, $D_i(t^0, R_0)$ is constructed by the $i^{th}$ mixer according to Eqn. (4) and is distinguished from the unwanted mixing products by the following $i^{th}$ band-pass filter. Following each band-pass filter, the time-domain IF components are digitized by analog-to-digital converters (ADC), and the fast Fourier transform (FFT) of the $i^{th}$ digitized signal is calculated according to Eqn. (5). The resulting NFFT components are combined, and the range-profile based on Eqn. (6) is generated. To ensure that the FFT components have the same $\omega_R$, which is necessary for the range resolution enhancement in Eqn. (6), the time-delays of the N receiver paths can be adjusted to become identical through a one-time off-line calibration.

The architecture of receiver 900 demonstrates inherent advantages over conventional wideband counterparts in a couple of ways. First, since a mixer (e.g., 905A, B, C) and a low-noise amplifier (LNA) (e.g., 910A, B, C) of each receiver path (e.g., Path A, Path B) operate within the corresponding sub-band, the integrated noise of each receiver path is, at least, 10 log(N) smaller than the conventional wideband receiver. Such smaller bandwidth leads to a front-end with much better sensitivity, thereby allowing target detection at longer distances. Second, due to smaller in-band integrated noise, the achievable signal-to-noise ratio of receiver 900 is higher than that in conventional FMCW receivers, which results in lower ADC resolution requirement. Finally, the design of high-performance front-ends over a wide range from 90-140 GHz is extremely challenging, which is not addressed by conventional receivers. This issue is resolved by receiver 900 by operating each path (e.g., Path A, B, C) across a lower bandwidth of Δf (e.g., 10 GHz).

Antenna Implementation and Packaging

Figure 10A:
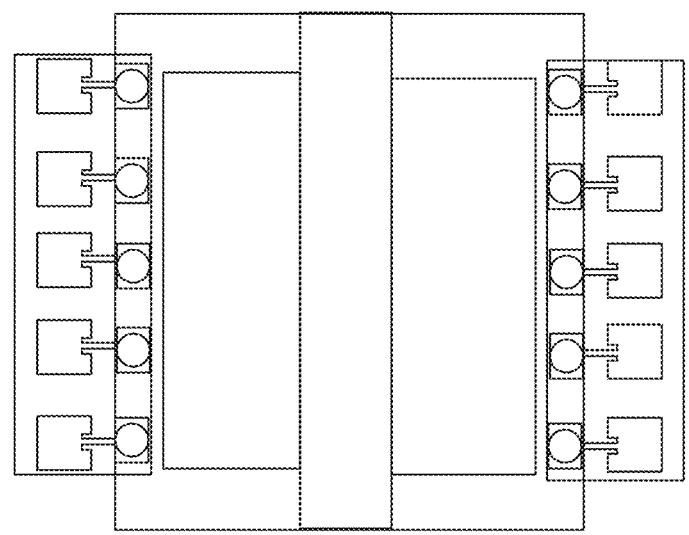
FIG. 10A is a top view of a stepped-chirp radar sensor integrated circuit packaging in accordance with some embodiments of the present disclosure.
Figure 10B:
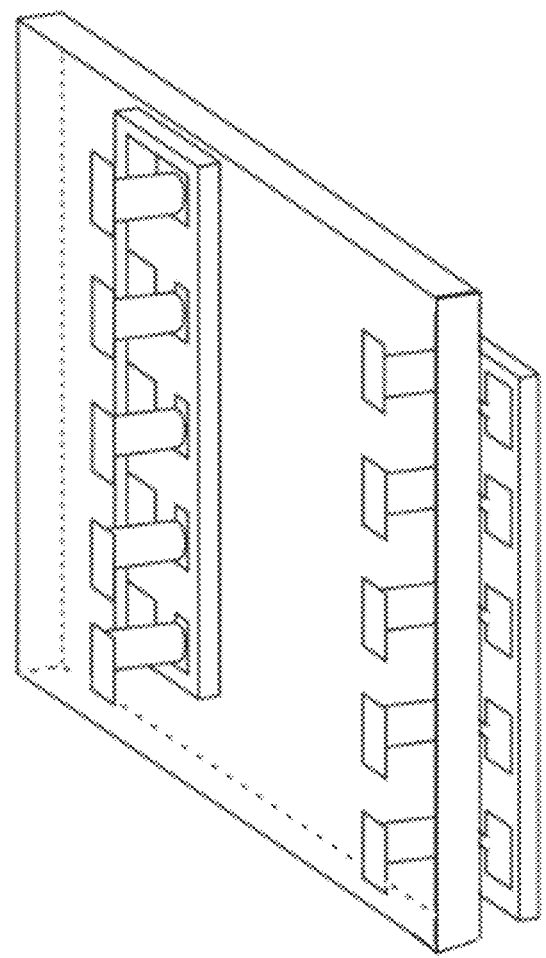
FIG. 10B is a perspective view of the stepped-chirp radar sensor integrated circuit packaging shown in FIG. 10A.

FIG. 10A illustrates a top view of a transmitter-receiver (transceiver) 1000 in accordance with some embodiments of the present disclosure. FIG. 10B illustrates a perspective view (from the back side) of transmitter-receiver 1000. In some embodiments, transmitter-receiver (TR) 1000 can include package antenna elements with higher efficiency and bandwidth (than their integrated on-chip counterparts) on both the transmitter and receiver components to efficiently illuminate the target with radio and collect strong reflected waves. TR 1000 can include a silicon chipset with transmitter and receiver circuits connected to the package antenna elements through flip-chip copper pillars (as shown in FIG. 10B). TR 1000 exhibits uniform matching conditions across the sub-bands, thereby introducing no group delay variations.

Figure 11C:
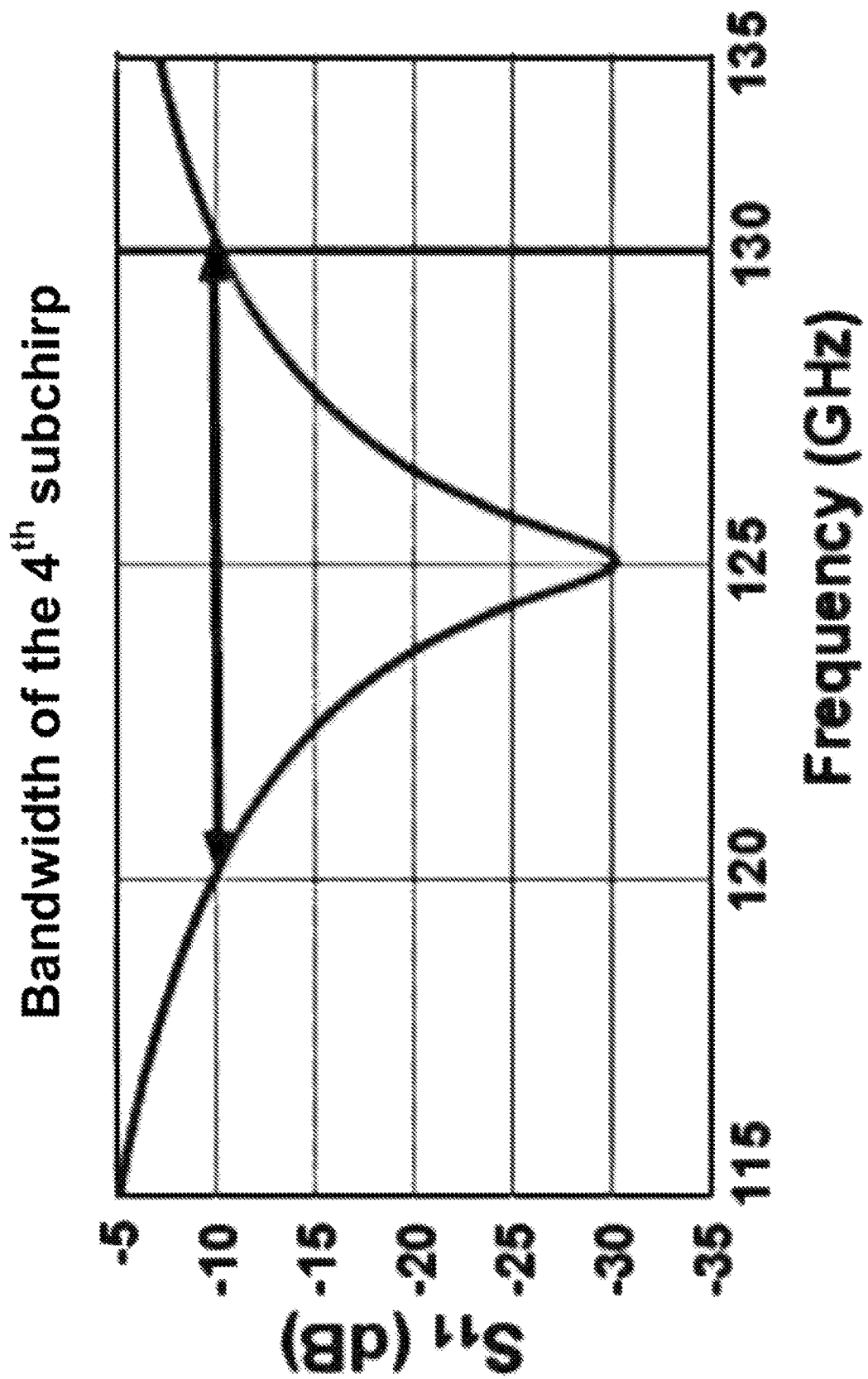
FIG. 11C is a chart illustrating the frequency response of the sub-band antenna.

To achieve a high radiation efficiency and excellent power matching across the entire synthetic bandwidth, TR 1000 (or transmitter 800) can employ N antenna elements corresponding to the N sub-bands. For example, on the transmitter side, the $i^{th}$ antenna can be fed by the $i^{th}$ VCO. Similarly, on the receiver side, a replica of the same antenna can both receive the incoming signal within the sub-band to significantly attenuate out-of-band interference. To design efficient antennas with sufficient bandwidth and selective frequency response, E-shape microstrip (patch) antennas can be used with planar inset feeding, see FIG. 11A. Simulation and experimental results confirm that the E-shape package antenna can achieve high gain as well as selective frequency response and sufficient bandwidth, see FIGS. 11B, C. In this manner, the above antenna configuration can be scalable and extendable to larger arrays, which can enhance the angular and cross-range resolutions. TR 1000 can include one or more features of any transmitter described above (e.g., 500, 550, 600, 800) and receiver 900.

Narrowband Interference Elimination from the Range-Profile

Figure 12A:
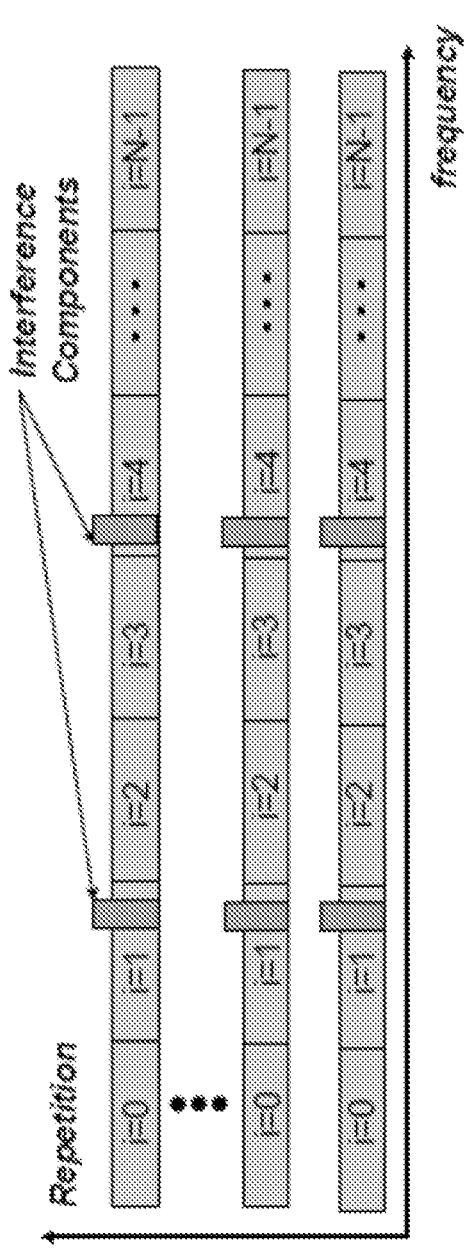
FIGS. 12A-B are charts illustrating sub-bands interference components.
Figure 12B:
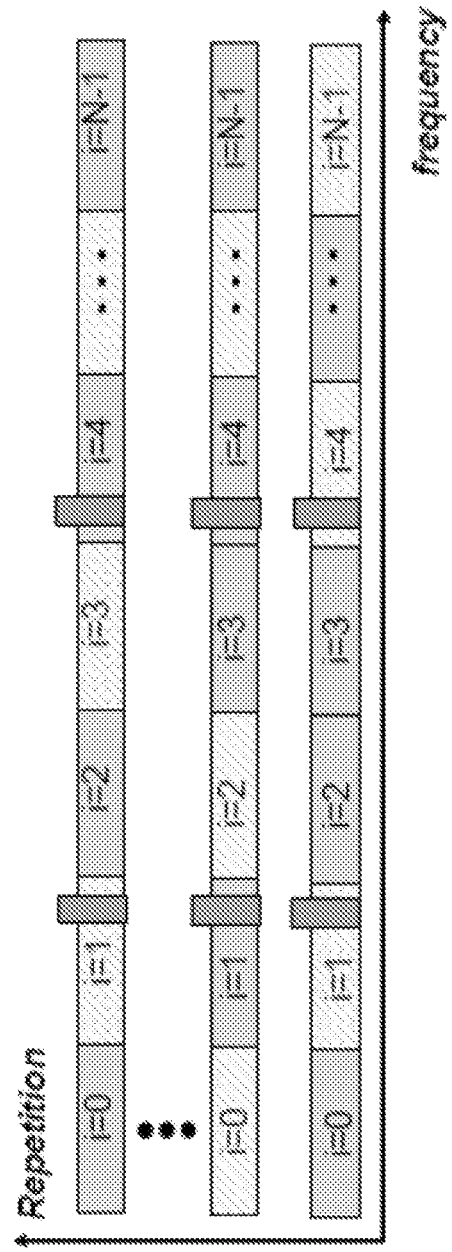

Conventional broadband FMCW radar sensors are highly susceptible to false range/velocity estimations in the presence of unwanted interference signals. For example, a radar that transmits continuous chirps cannot exclude the effect of interference at any stage, i.e., transmission or reception. Owing to its segmented structure, the disclosed stepped-chirp radar sensor has the ability to reduce (and even eliminate) the effect of unwanted narrowband interference. Under interference-free condition, the range-profile of the received signal is comprised of the IF component $D_0(R, t)$ and its N−1 delayed replicas. If the $i^{th}$ sub-chirp $0 \le i \le N-1$ has an in-band interference component, the $D_i(R, \omega)$ components in both Eqn. (5) and Eqn. (6) are distorted. By finding or learning a measure of similarity between sets of $D_i(R, \omega)$ component of the same class (e.g., frequency domain profile shape), the final IDFT can be performed on the functions from the same class and the distorted ones can be removed. To exclude the affected sub-bands by interference, switching on/off high-frequency signals at the transmitter or receiver is avoided to lower the loss and maintain the linearity of the chirp profile. The selection of the frequency functions from the same class is performed after Eqn. (5) which has no adverse effects on the RF performance of the radar sensor. The removal of affected sub-bands from IDFT degrades the range resolution; however, the achievable range profile still maintains the important attributes of the object, i.e., location and velocity. FIG. 12A shows an inclusion of all sub-bands reflecting the distortion from the interference. FIG. 12B shows the sub-bands from the same class being included in the final IDFT.

CONCLUSION

One or more of the components, processes, features, and/or functions illustrated in the figures may be rearranged and/or combined into a single component, block, feature or function or embodied in several components, steps, or functions. Additional elements, components, processes, and/or functions may also be added without departing from the disclosure. The apparatus, devices, and/or components illustrated in the Figures may be configured to perform one or more of the methods, features, or processes described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and processes have been described above generally in terms of their functionality. Whether such functionality is implemented as hardware or software depends upon the particular application and design constraints imposed on the overall system.

The enablements described above are considered novel over the prior art and are considered critical to the operation of at least one aspect of the disclosure and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc," and "or" indicates non-exclusive alternatives without limitation, unless otherwise noted. The use of "including" or "includes" means "including, but not limited to," or "includes, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

The invention claimed is:

1. A radar system comprising:
a first and second dual-voltage control oscillator (d-VCO);
a reference (phased locked loop) PLL coupled to the first d-VCO, the reference PLL configured to control an oscillation frequency range of the first d-VCO with a first output control voltage;
a first mixing phase-lock loop (PLL) configured to receive outputs from the first and the second d-VCOs and to output a second output control voltage to control an oscillation frequency range of the first and second d-VCOs;
a third d-VCO; and
a second mixing phase-lock loop (PLL) configured to receive outputs from the second and the third d-VCOs, and to output a third output control voltage to control an oscillation frequency range of the second and third d-VCOs such that there is a frequency range difference between an oscillation frequency range of the second and third d-VCOs.

2. The radar system of claim 1, further comprising:
a frequency reference generator configured to output a reference frequency; and
an injection-locked amplifier (ILA) configured to receive an output of the frequency reference generator and to provide an output signal to the reference PLL.

3. The radar system of claim 2, wherein the ILA is configured to sweep an oscillation frequency of the first d-VCO, and the first mixing PLL is configured to control the oscillation frequency of the second d-VCO such that there is a frequency difference from the oscillation frequency of the first d-VCO.

4. The radar system of claim 1, wherein the first and second mixing PLLs are locked to the same frequency, and wherein the oscillation frequency range of each d-VCO is different.

5. The radar system of claim 1, further comprising:
a plurality of narrowband receivers, wherein each narrowband receiver is configured to a different range of sub-band frequencies.

6. The radar system of claim 5, wherein a first narrowband receiver of the plurality of narrowband receivers comprises:
an antenna;
a low noise amplifier coupled to the antenna; and
a mixer coupled to the low noise amplifier, the first d-VCO, and a bandpass filter.

7. The radar system of claim 6, wherein a second narrowband receiver of the plurality of narrowband receivers comprises:
a second antenna;
a second low noise amplifier coupled to the antenna; and
a second mixer coupled to the second low noise amplifier, the second d-VCO, and a second bandpass filter.

8. The radar system of claim 1, wherein each d-VCO comprises a tunable coupling coupled to a first and second voltage controlled oscillator.

9. The radar system of claim 8, wherein each d-VCO comprises a first and second varactor coupled to the tunable coupling.

10. A stepped chirp transceiver comprising:
a reference PLL;
a reference frequency generator configured to sweep an input frequency of the reference PLL; and
a plurality of stepped chirp circuit assemblies coupled in series, wherein a first stepped chirp circuit assembly is coupled to an output control voltage of the reference PLL, and where each stepped chirp circuit assembly is configured to output a different range of output frequencies.

11. The stepped chirp transceiver of claim 10, wherein each stepped chirp circuit assembly is configured to control an output frequency range of an immediately subsequent stepped chirp circuit assembly.

12. The stepped chirp transceiver of claim 10, wherein the first stepped chirp circuit assembly comprises a first and a second dual-voltage control oscillator (d-VCO), wherein the second VCO is configured to receive an output signal from a second stepped chirp circuit.

13. The stepped chirp transceiver of claim 10, wherein each stepped chirp circuit assembly after the first stepped chirp circuit assembly comprises a mixer and a d-VCO coupled to a first input of the mixer, wherein the mixer is configured to receive an output signal from a preceding d-VCO of a preceding stepped chirp circuit assembly.

14. The stepped chirp transceiver of claim 10, wherein each stepped chirp circuit assembly comprises a mixing phase-locked loop (PLL), and wherein the mixing PLL of each stepped chirp circuit assembly is locked to a same operating frequency.

15. The stepped chirp transceiver of claim 10, further comprising:
- a plurality of narrowband receivers, wherein each narrowband receiver is configured to a different range of sub-band frequencies.

16. The stepped chirp transceiver of claim 15, wherein a first narrowband receiver of the plurality of narrowband receivers comprises:
- an antenna;
- a low noise amplifier coupled to the antenna; and
- a mixer coupled to the low noise amplifier, a first d-VCO, and a bandpass filter.

17. The stepped chirp transceiver of claim 12, wherein the first d-VCO comprises:
- an antenna;
- a low noise amplifier coupled to the antenna; and
- a mixer coupled to the low noise amplifier and a bandpass filter.

18. The stepped chirp transceiver of claim 12, wherein each d-VCO comprises a tunable coupling coupled to a first and second voltage controlled oscillator.

19. The stepped chirp transceiver of claim 18, wherein each d-VCO comprises a first and second varactor coupled to the tunable coupling.

\* \* \* \* \*